US012181935B2

(12) United States Patent
Hsiang et al.

(10) Patent No.: US 12,181,935 B2
(45) Date of Patent: Dec. 31, 2024

(54) WATER DROP-TYPE HINGE IN A COMPUTING DEVICE HAVING A FLEXIBLE DISPLAY

(71) Applicant: Google LLC, Mountain View, CA (US)

(72) Inventors: Shih Wei Hsiang, New Taipei (TW); Po-Kai Lai, New Taipei (TW); Jengn Wen Lin, New Taipei (TW); Hung-Wei Wang, New Taipei (TW)

(73) Assignee: Google LLC, Mountain View, CA (US)

( * ) Notice: Subject to any disclaimer, the term of this patent is extended or adjusted under 35 U.S.C. 154(b) by 202 days.

(21) Appl. No.: 18/002,145

(22) PCT Filed: Oct. 29, 2020

(86) PCT No.: PCT/US2020/057927
§ 371 (c)(1),
(2) Date: Dec. 16, 2022

(87) PCT Pub. No.: WO2022/093229
PCT Pub. Date: May 5, 2022

(65) Prior Publication Data
US 2023/0229203 A1    Jul. 20, 2023

(51) Int. Cl.
*G06F 1/20*    (2006.01)
*G06F 1/16*    (2006.01)

(52) U.S. Cl.
CPC .......... *G06F 1/1681* (2013.01); *G06F 1/1616* (2013.01); *G06F 1/1624* (2013.01); *G06F 1/1652* (2013.01)

(58) Field of Classification Search
None
See application file for complete search history.

(56) References Cited

U.S. PATENT DOCUMENTS 8,451,601 B2    5/2013  Bohn et al.
10,429,885 B1 *  10/2019  Shaw ..................... G06F 1/166
(Continued)

FOREIGN PATENT DOCUMENTS

WO    2019134695 A1    7/2019
WO    2020210987 A1    10/2020

OTHER PUBLICATIONS

International Preliminary Report on Patentability from International Application No. PCT/US2020/057927 dated May 11, 2023, 7 pp.

(Continued)

*Primary Examiner* — Xanthia C Relford
(74) *Attorney, Agent, or Firm* — Shumaker & Sieffert, P.A.

(57) ABSTRACT

An example computing device includes a flexible display coupled to a housing that includes a support plate having a first joint coupled to a first end of the support plate and a second joint coupled to a second end of the support plate. A slide module has a slot that guides a linear slide movement of the second joint along a linear path of movement within the slot as the support plate pivots about the first joint, where the support plate moves according to the first joint and the second joint to support at least the portion of the flexible display when the flexible display is unfolded and moves according to the first joint and the second joint to create a gap between at least a portion of the support plate and at least the portion of the flexible display when the flexible display is folded.

16 Claims, 15 Drawing Sheets

(56) References Cited

U.S. PATENT DOCUMENTS

| | | |
|---|---|---|
| 10,429,904 B2 | 10/2019 | Turchin et al. |
| 10,601,967 B1 | 3/2020 | Harmon et al. |
| 10,761,574 B1 | 9/2020 | Hsu et al. |
| 2017/0115701 A1 | 4/2017 | Bae et al. |
| 2019/0317571 A1* | 10/2019 | North .................. H05K 7/2039 |
| 2019/0317578 A1* | 10/2019 | North ...................... G06F 1/206 |
| 2023/0229203 A1* | 7/2023 | Hsiang .................. G06F 1/1681 |
| | | 361/679.27 |

OTHER PUBLICATIONS

International Search Report and Written Opinion of International Application No. PCT/US2020/057927 dated Jul. 8, 2021, 8 pp.

* cited by examiner

WATER DROP-TYPE HINGE IN A COMPUTING DEVICE HAVING A FLEXIBLE DISPLAY

BACKGROUND

Computing devices, such as smartphones, laptops, and tablets, may include a display for outputting content such as user interfaces, text, photos, videos, and the like. While conventional displays for computing devices have typically been rigid surfaces made of rigid materials, such as glass, that cannot be folded or otherwise bent, flexible displays made of flexible materials, such as plastic, that can be bent or folded have been recently developed that enable manufacturers and designers of mobile computing devices to reimagine the form factors of computing devices. Such computing devices with reimagined form factors may include, for example, clamshell or foldable computing devices in which two or more sections of the computing device can be flipped open and closed.

SUMMARY

In general, this disclosure describes a computing device having support plates for supporting a flexible display in the computing device. A flexible display, such as a flexible organic light-emitting diode display, may be made up of multiple layers of material, such as plastic film. For example, a flexible display may include one or more cathode layers, a conductive layer, an emissive layer, an anode layer, and a flexible substrate.

Due to the flexibility of the flexible display, the computing device may include support plates that meet the flexible display and provide support to the flexible display when the flexible display of a computing device is unfolded, such as when the flexible display is laid flat. However, when the flexible display is folded (e.g., in half), internal stress in the bending area of the flexible display cause the bending area of the flexible display to bulge outwards compared with areas of the flexible display that are not bent. As such, if the support plates do not leave sufficient space for the outward bulging of the bending area of the flexible display when the flexible display is bent, the support plates may cause additional stress by pressing against the flexible display.

In accordance with aspects of the present disclosure, to prevent introducing additional stress to the flexible display when the flexible display is folded, the computing device may utilize a water drop-type hinge mechanism that moves support plates in the computing device towards the flexible display as the flexible display is unfolded to provide support to the flexible display when the flexible display of a computing device is unfolded, and that moves the support plates away from the flexible display as the flexile display is folded, thereby creating a gap between the flexible display and the support plates when the flexible display is folded for the outward bulging of the bending area of the flexible display when the flexible display is folded. To that end, while a support plate may rotate according to a first joint at a first end of the support plate, the computing device may include a slide module that guides the linear movement of an opposing end of the support plate, such that the support plate moves towards the flexible display as the flexible display is unfolded, and moves away from the flexible display as the flexible display is folded, thereby creating a gap between the flexible display and the support plate when the flexible display is folded. In this way, the computing device prevents the introduction of additional stress to the flexible display when folded, thereby increasing the reliability and operational longevity of the flexible display.

In one example, a computing device includes a housing. The computing device further includes a flexible display operable to be folded to a first position and unfolded to a second position, wherein the flexible display is coupled to the housing. The computing device further includes a support plate for supporting at least a portion of the flexible display when the flexible display is unfolded to at least the second position, the support plate being disposed within the housing between at least a portion of the flexible display and a portion of the housing, the support plate having a first joint coupled to a first end of the support plate and a second joint coupled to a second end of the support plate distal from the first end of the support plate, and the support plate being pivotable about the first joint as the flexible display is folded and unfolded between the first position and the second position. The computing device further includes a slide module in the housing having a fixed position in relation to the housing, the slide module having a slot that accepts the second joint and guides a linear slide movement of the second joint along a linear path of movement within the slot as the support plate pivots about the first joint, wherein the support plate moves according to the first joint and the second joint to support at least the portion of the flexible display when the flexible display is unfolded to the second position and moves according to the first joint and the second joint to create a gap between at least a portion of the support plate and at least the portion of the flexible display when the flexible display is folded to the first position.

In another example, a computing device includes a flexible display operable to be folded and unfolded, wherein the flexible display is folded when the computing device is in a closed position and fully unfolded when the computing device is in an open position. The computing device further includes a first housing coupled to the flexible display, wherein the first housing pivots about a first joint coupled to the first housing. The computing device further includes a second housing coupled to the flexible display, wherein the second housing pivots about a second joint coupled to the second housing. The computing device further includes a slide module coupled to the first housing, the slide module having a slot. The computing device further includes a support plate disposed between a portion of the first housing and a portion of the flexible display, wherein the support plate is coupled to a third joint at a first end of the support plate and to a fourth joint coupled to a second end of the support plate distal to the first end of the support plate, wherein the support plate rotates about the third joint, and wherein at least a portion of the fourth joint is disposed in the slot of the slide module, wherein the slot of the slide module define a linear path of movement for the fourth joint such that when the support plate rotates about the third joint, the fourth joint moves according to the linear path of movement, such that when the first housing and the second housing rotatably moves away from each other, the movement of the fourth joint according to the linear path of movement causes a portion of the support plate to moves towards the flexible display and to meet the flexible display when the computing device is in the open position, and when the first housing and the second housing rotatably moves towards each other, the movement of the fourth joint according to the linear path of movement causes the portion of the support plate to move away from the flexible display and to leave a gap between the portion of the support plate and the flexible display when the computing device is in the closed position.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1A:
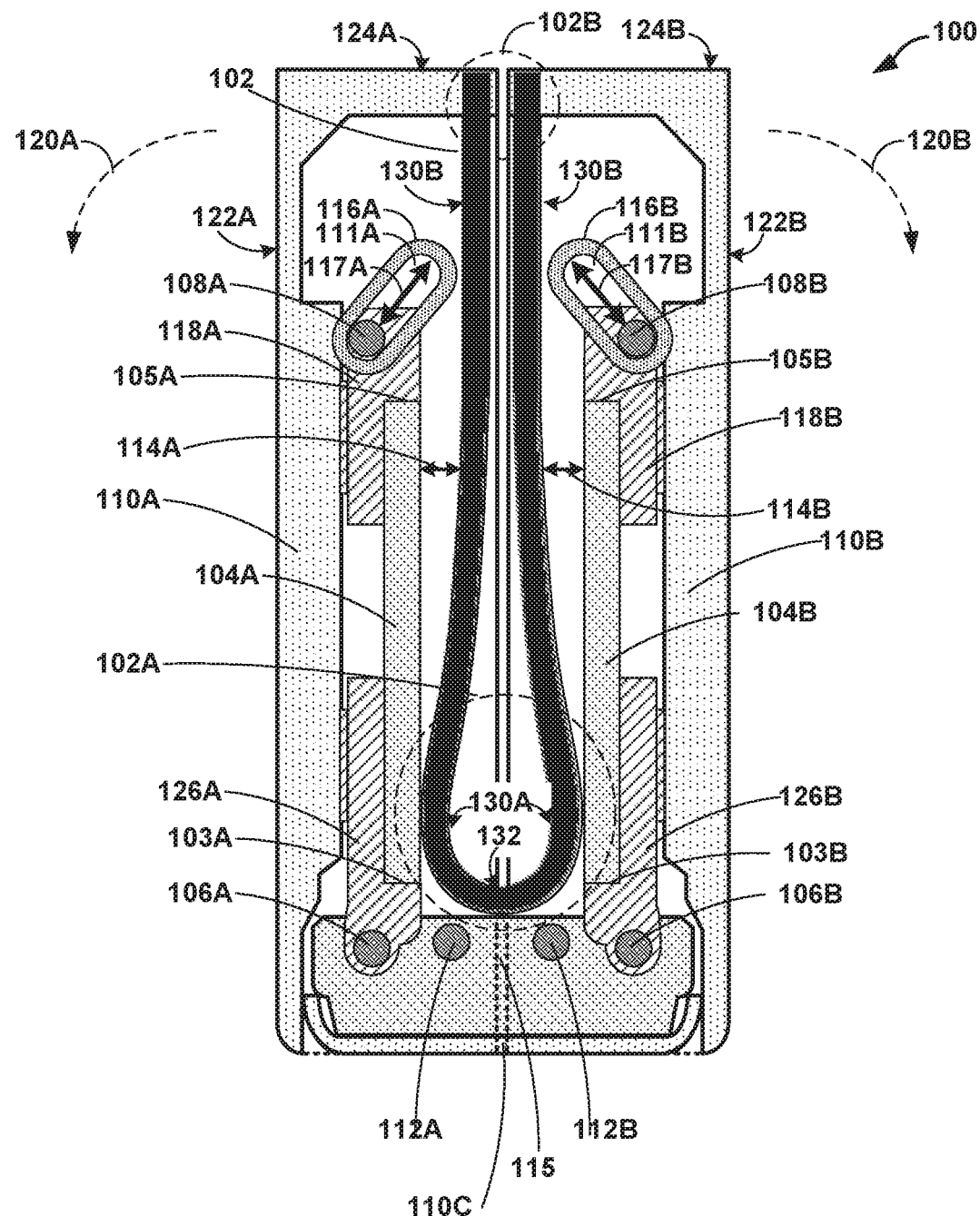
FIGS. 1A-1C are conceptual diagrams illustrating a cross-sectional profile view of an example computing device having a flexible display, in accordance with one or more aspects of this disclosure.
Figure 1B:
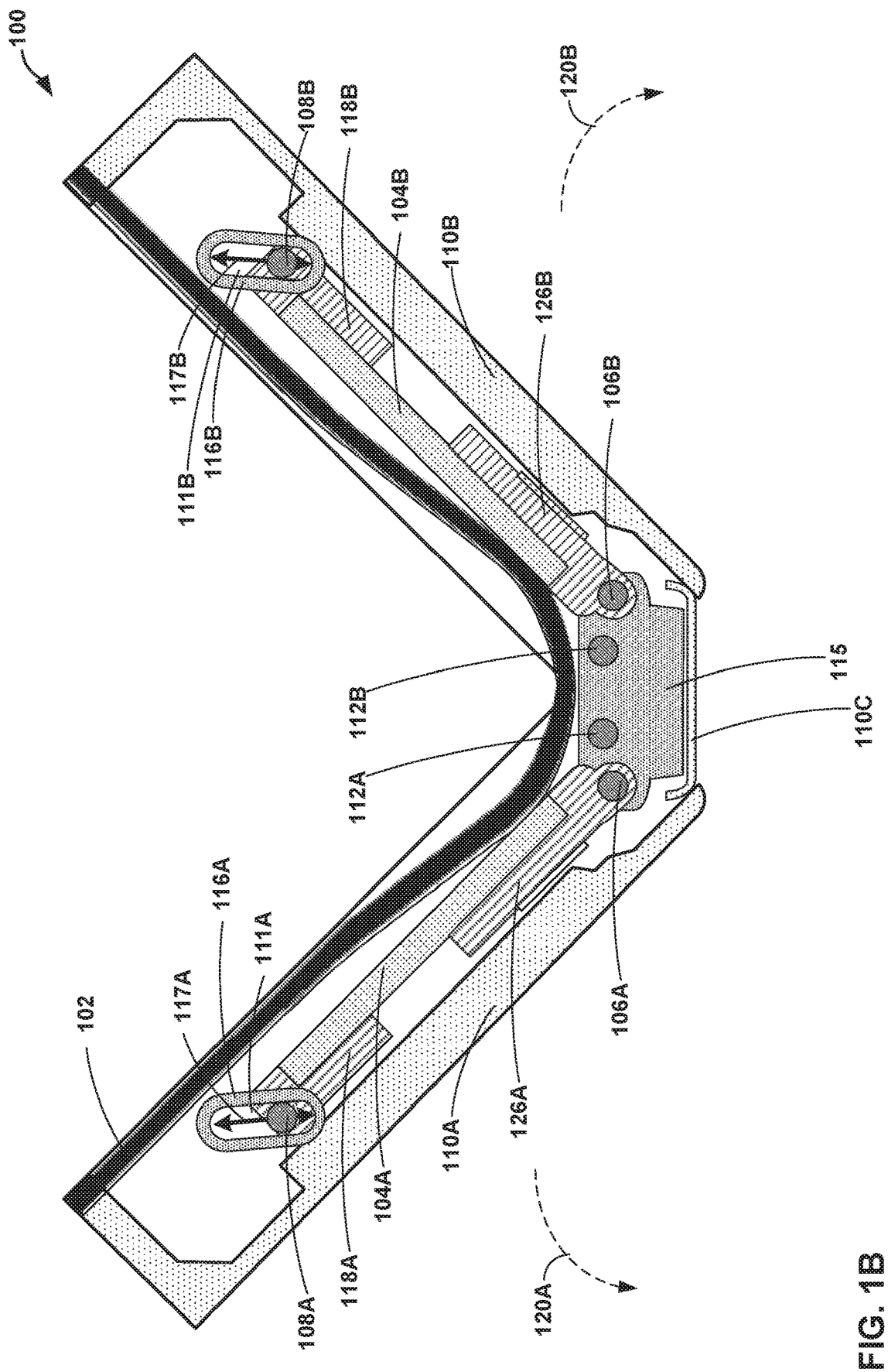
Figure 1C:
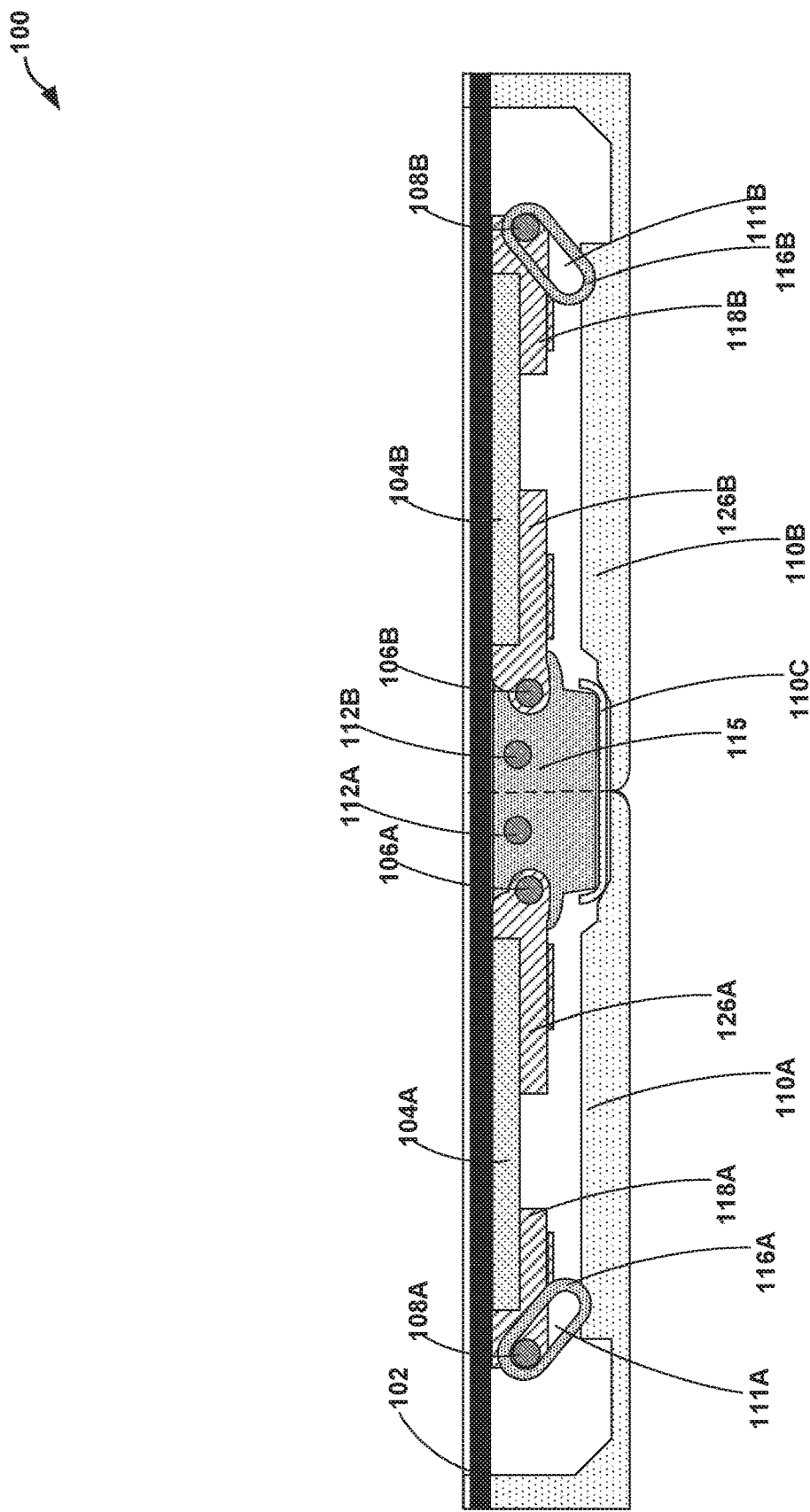

FIGS. 1A-1C are conceptual diagrams illustrating a cross-sectional profile view of an example computing device having a flexible display, in accordance with one or more aspects of this disclosure. As shown in FIGS. 1A-1C, computing device 100 includes flexible display 102, such as a flexible organic light-emitting diode display or any other suitable flexible display.

Computing device 100 may include housing 110A-110C that forms at least a portion of the exterior of computing device 100. Housing 110A may include top portion 124A and side portion 122A while housing 110B may include top portion 124B and side portion 122B. When computing device 100 is in a closed position, as shown in FIG. 1A, top portion 124A and top portion 124B may define at least a portion of a top external end of computing device 100 that is opposite housing 110C that may define at least a portion of a bottom external end of computing device 100, while side portion 122A of housing 110A and side portion of 122B of housing 110B may each define at least a portion of an exterior side of computing device 100, where side portion 122A and side portion 122B may define opposite external sides of computing device 100.

Computing device 100 may include joint module 115 which accepts joints 106A and 106B and joints 112A and 112B. Housing 110A may be coupled to joint 112A and housing 110B may be coupled to joint 112B so that housing 110A may pivot about joint 112A and housing 110B may pivot about joint 112B. When computing device 100 is in a closed position, as shown in FIG. 1A, housing 110A and housing 110B are disposed substantially parallel to each other, and housing 110A may pivot about joint 112A to rotate away from housing 110B, such as according to path 120A, and housing 110B may pivot about joint 112B to rotate away from housing 110A, such as according to path 120B.

Computing device 100 may include support plates 104A and 104B to provide support for flexible display 102. Support plate 104A may be housed in housing 110A and support plate 104B may be housed in housing 110B. In some examples, when computing device 100 is in a closed position, such as shown in FIG. 1A, support plate 104A may be substantially parallel with respect to side portion 122A of housing 110A and support plate 104B may be substantially parallel with respect to side portion 122B of housing 110B, and support plate 104A and support plate 104B may be substantially parallel with respect to each other.

Support plate 104A may be coupled to joint 106A via connector 126A at end 103A of support plate 104A, and support plate 104B may be coupled to joint 106B via connector 126B at end 103B of support plate 104B, so that support plate 104A may pivot about joint 106A and support plate 104B may pivot about joint 106B to rotatably move towards and away from flexible display 102. When computing device 100 is in a closed position, as shown in FIG. 1A, support plate 104A may pivot about joint 106A to rotate away from support plate 104B, and support plate 104B may pivot about joint 106B to rotate away from support plate 104A.

Joint module 115 may include or otherwise accept joints 112A and 112B and joints 106A and 106B. That is, in some examples, joints 112A and 112B and/or joints 106A and 106B may be pins or other components coupled to or accepted by joint module 115 to connect to housing 110A, housing 110B, support plate 104A, and support plate 104B.

When computing device 100 is in a closed position, as shown in FIG. 1A, flexible display 102 may be folded at point 132 into two substantially similar halves, and flexible display 102 forms a waterdrop shape, where folded portion 102B of flexible display 102 bulges outwards compared with edge portion 102A of flexible display 102. Flexible display 102 has an exterior surface 130A and an interior surface 130B, where the interior surface 130B may face support plates 104A and 104B while portions of exterior surface 130A may face each other.

Support plates 104A and 104B may provide support for flexible display 102 when flexible display 102 is in a fully unfolded position, such as shown in FIG. 1C, such that support plates 104A and 104B may each meet at least a portion of interior surface 130B of flexible display 102 to provide support for flexible display 102. However, when flexible display 102 is folded to a closed position, such as shown in FIG. 1A, portions of interior surface 130 of flexible display 102, such as the portions of interior surface 130 of flexible display 102 in folded portion 102B of flexible display 102, may bulge out towards support plates 104A and 104B.

As such, when flexible display 102 is folded to a closed position, support plates 104A and 104B are disposed within housing 110A and 110B, respectively, such that there is a gap 114A between a surface of at least a portion of support plate 104A that faces flexible display 102 and at least a portion of interior surface 130B of flexible display 102 that faces housing 110A, and a gap 114B between a surface of at least a portion of support plate 104B that faces flexible display 102 and at least a portion of interior surface 130B of flexible display 102 that faces housing 110B.

To guide the movement of support plates 104A and 104B so that there is a gap 114A between at least a portion of support plate 104A and at least a portion of interior surface 130B of flexible display 102 that faces housing 110A and that there is a gap 114B between at least a portion of support plate 104B and at least a portion of interior surface 130B of flexible display 102 that faces housing 110B when computing device 100 is in a closed position, such as shown in FIG. 1A, housing 110A and 110B may include slide module 116A and slide module 116B, respectively for guiding the movement of support plates 104A and 104B, respectively.

Slide modules 116A and 116B may each have a fixed position with respect to housing 110A and housing 110B, respectively. That is, the position of slide module 116A is fixed in relation to housing 110A regardless the rotation of housing 110A about joint 112A, and the position of slide module 116B is fixed in relation to housing 110B regardless the rotation of housing 110B about joint 112B. In some examples, slide module 116A may be attached or otherwise coupled to housing 110A in the interior of housing 110A and slide module 116B may be attached or otherwise coupled to housing 110B in the interior of housing 110B.

Support plate 104A may be coupled to joint 108A, such as a pin, via connector 118A at end 105A of support plate 104A distal to end 103A and support plate 104B may be coupled to joint 108B, such as a pin, via connector 118B at end 105A of support plate 104A distal to end 103B. In some examples, support plate 104A may be directly coupled to joint 108A without connector 118A, such as when connector 118A is a part of support plate 104A, and support plate 104B may be directly coupled to joint 108B without connector 118B, such as when connector 118B is a part of support plate 104B.

Slide module 116A may include slot 111A that accepts at least a portion of joint 108A and that guides a slide movement of joint 108A along a linear direction within slot 111A as support plate 104A pivots about joint 106A. That is, slot 111A may define a linear path of movement 117A for joint 108A as support plate 104A pivots about joint 106A, thereby guiding the movement of at least a portion of support plate 104A towards and away from flexible display 102 as support plate 104A pivots about joint 106A.

Similarly, slide module 116B may include slot 111B that accepts at least a portion of joint 108B and that guides a slide movement of joint 108B along a linear direction within slot 111B as support plate 104B pivots about joint 106B. That is, slot 111B may define a linear path of movement 117B for joint 108B as support plate 104B pivots about joint 106B, thereby guiding the movement of at least a portion of support plate 104B towards and away from flexible display 102 as support plate 104B pivots about joint 106B.

For example, slot 111A may guide the linear movement of joint 108A along linear path of movement 117A to cause at least a portion of support plate 104A coupled to joint 108A to move towards interior surface 130B of flexible display 102 as housing 110A pivots about joint 112A away from housing 110B, such as according to path 120A, and may guide the linear movement of joint 108A along linear path of movement 117A to cause at least a portion of support plate 104A coupled to joint 108A to move away from interior surface 130B of flexible display 102 as housing 110A pivots about joint 112A back towards housing 110B.

Similarly, slot 111B may guide the linear movement of joint 108B along linear path of movement 117B to cause at least a portion of support plate 104B coupled to joint 108B to move towards interior surface 130B of flexible display 102 as housing 110B pivots about joint 112B away from housing 110A, such as according to path 120B, and may guide the linear movement of joint 108B along linear path of movement 117B to cause at least a portion of support plate 104B coupled to joint 108B to move away from interior surface 130B of flexible display 102 as housing 110B pivots about joint 112B back towards housing 110A.

When computing device 100 is in a closed position, such as shown in FIG. 1A, joint 108A is positioned in slot 111A such that such that there is a gap 114A between a surface of at least a portion of support plate 104A that faces flexible display 102 and at least a portion of interior surface 130B of flexible display 102 that faces housing 110A. When housing 110A pivots about joint 112A to rotatable move away from housing 110B, such as according to path 120A, so that computing device 100 transitions from a closed position to a partially open position, such as shown in FIG. 1B, slot 111A guides the linear movement of joint 108A along linear path of movement 117A away from side portion 122A of housing 110A. Because joint 108A is coupled to end 105A of support plate 104A, the linear movement of joint 108A along linear path of movement 117A away from side portion 122A of housing 110A causes at least a portion of support plate 104A near end 105A to move towards at least a portion of interior surface 130B of flexible display 102 that faces housing 110A, thereby decreasing gap 114A between a surface of at least a portion of support plate 104A that faces flexible display 102 and at least a portion of interior surface 130B of flexible display 102 that faces housing 110A.

From the partially open position shown in FIG. 1B, housing 110A may further pivot about joint 112A to rotatably move away from housing 110B, such as according to path 120A, so that computing device 100 transitions from the partially open position, such as shown in FIG. 1B, to a fully open position, as shown in FIG. 1C.

Similarly, when computing device 100 is in a closed position, such as shown in FIG. 1A, joint 108B is positioned in slot 111B such that such that there is a gap 114B between a surface of at least a portion of support plate 104B that faces flexible display 102 and at least a portion of interior surface 130B of flexible display 102 that faces housing 110B. When housing 110B pivots about joint 112B to rotatably move away from housing 110B, such as according to path 120B, so that computing device 100 transitions from a closed position to a partially open position, such as shown in FIG. 1B, slot 111B guides the linear movement of joint 108B along linear path of movement 117B away from side portion 122B of housing 110B. Because joint 108B is coupled to end 105B of support plate 104B, the linear movement of joint 108B along linear path of movement 117B away from side portion 122B of housing 110B causes at least a portion of support plate 104B to move towards at least a portion of interior surface 130B of flexible display 102 that faces housing 110B, thereby decreasing gap 114B between a surface of at least a portion of support plate 104B that faces flexible display 102 and at least a portion of interior surface 130B of flexible display 102 that faces housing 110B.

When computing device 100 is in a partially open position, such as shown in FIG. 1B, housing 110A of computing device 100 may further pivot about joint 112A to rotatably move away from housing 110B and housing 100B of computing device 100 may further pivot about joint 112B to rotatably move away from housing 110A until computing device 100 transitions to a fully open position, such as shown in FIG. 1C. As housing 110A rotates away from housing 110B, slot 111A may continue to guide the linear movement of joint 108A along linear path of movement 117A away from side portion 122A of housing 110A and cause at least a portion of support plate 104A to move towards at least a portion of interior surface 130B of flexible display 102 that faces housing 110A until support plate 104A meets a portion of interior surface 130B of flexible display 102. Similarly, as housing 110B rotates away from housing 110A, slot 111B may continue to guide the linear movement of joint 108B along linear path of movement 117B away from side portion 122B of housing 110B and cause at least a portion of support plate 104B to move towards at least a portion of interior surface 130B of flexible display 102 that faces housing 110B until support plate 104B meets a portion of interior surface 130B of flexible display 102.

As shown in FIG. 1C, when computing device 100 is in the fully open position, flexible display 102 may be fully unfolded into a flat surface, and support plates 104A and 104B may each meet a portion of interior surface 130B of flexible display 102 to provide support for flexible display 102. As such, when computing device 100 is in the fully open position, there may no longer be a gap between flexible display 102 support plates 104A and 104B. When computing device 100 is in the fully open position, housing 110A and housing 110B may pivot about joints 112A and 112B, respectively, to rotatably move back towards each other to transition computing device 100 from the fully open position to a partially open position, such as shown in FIG. 1B, and from the partially open position to a closed position, such as shown by FIG. 1A.

To transition computing device 100 from the fully open position to a partially open position or a closed position, housing 110A of computing device 100 may pivot about joint 112A to rotatably move towards housing 110B, and housing 100B of computing device 100 may pivot about joint 112B to rotatably move towards housing 110A until computing device 100. As housing 110A rotates towards housing 110B, support plate 104A may correspondingly pivot about joint 106A, and slot 111A may guide the linear movement of joint 108A along linear path of movement 117A away from flexible display 102, thereby causing at least a portion of support plate 104A to move away from flexible display 102. Similarly, as housing 110B rotates towards housing 110A, support plate 104B may correspondingly pivot about joint 106B, and slot 111B may guide the linear movement of joint 108B along linear path of movement 117B away from flexible display 102, thereby causing at least a portion of support plate 104B to move away from flexible display 102.

In this way, as shown in FIGS. 1A-1C, slide modules 116A-116B guides the movement of support plates 104A and 104B and the distance between flexible display 102 and support plates 104A and 104B such that they may fully support flexible display 102 when flexible display 102 is in the fully open position, such as shown in FIG. 1C while creating gaps 114A and 114B between flexible display 102 and support plates 104A and 104B when flexible display 102 is folded, such as shown in FIG. 1A, thereby leaving room for the folded area of flexible display 102 to bulge outwards towards support plates 104A and 104B. The guided movement of support plates 104A and 104B away from flexible display 102 as flexible display 102 is folded may minimize the amount of stress that is applied by support plates 104A and 104B to flexible display 102 when flexible display 102 is folded, thereby increasing the reliability and longevity of flexible display 102.

As can be seen in FIGS. 1A-1C, the hinge structure of support plate 104A may include joint 106A, joint 108A, and slide module 116A. Similarly, the hinge structure of support plate 104B may include joint 106B, joint 108B, and slide module 116B. Following the Grubler formula $F=3(N-1)-\Sigma C_i J_i$, where F is the degree of freedom, N is the quantity of linkages, and $C_i J_i$ is the degree of constraint by each joint, the hinge structure of support plate 104A and the hinge structure of support plate 104B may each have 1 degree of freedom.

In this way, the hinge structure of support plate 104A that includes joint 106A, joint 108A, and slide module 116A guides the movement of support plate 104A towards flexible display 102 as housing 100A moves away from housing 100B, such that support plate 104A meets flexible display 102 when computing device 100 is in a fully open position, and guides the movement of support plate 104B away from flexible display 102 as housing 100A moves towards housing 100B, such that there is a gap 114A between support plate 104A and flexible display 102 when computing device 100 is in a closed position. Similarly, the hinge structure of support plate 104B that includes joint 106B, joint 108B, and slide module 116B guides the movement of support plate 104B towards flexible display 102 as housing 100B moves away from housing 100A, such that support plate 104B meets flexible display 102 when computing device 100 is in a fully open position, and guides the movement of support plate 104B away from flexible display 102 as housing 100B moves towards housing 100A, such that there is a gap 114B between support plate 104B and flexible display 102 when computing device 100 is in a closed position. The guided movement of support plates 104A and 104B away from flexible display 102 as flexible display 102 is folded may minimize the amount of stress that is applied by support plates 104A and 104B to flexible display 102 when flexible display 102 is folded, thereby increasing the reliability and longevity of flexible display 102.

FIGS. 2A-2F are conceptual diagrams illustrating a cross-sectional profile view of an example computing device having a flexible display and an autolocking cam system, in accordance with one or more aspects of this disclosure. A computing device may include an autolocking cam system that locks support plates when the computing device is in a closed position, such as shown in FIG. 1A, or in a fully open position, such as shown in FIG. 1C. The autolocking cam system may stabilize the support plates as well as the position of the housings of the computing device when the computing device is fully open or closed.

Figure 2A:
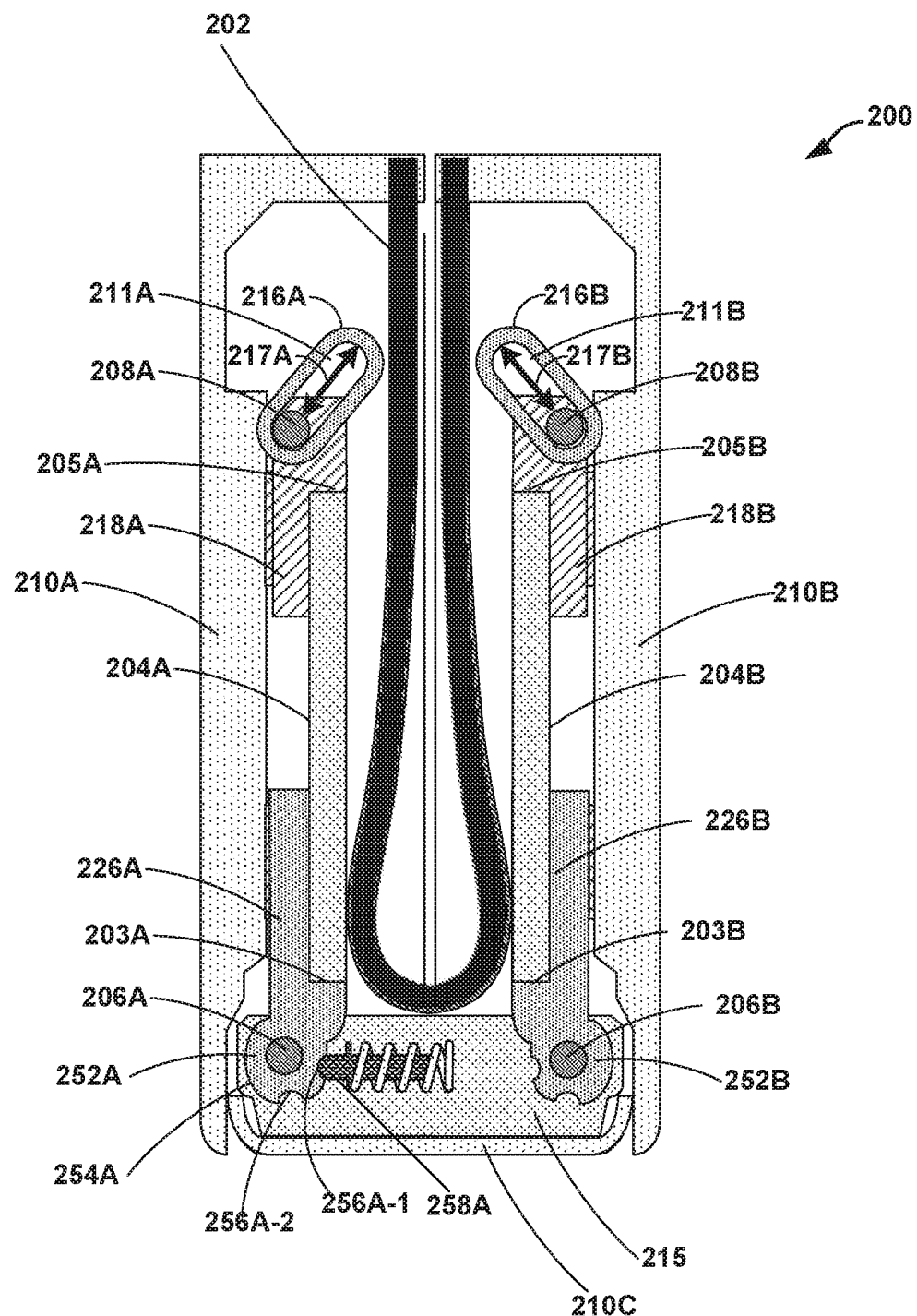
FIGS. 2A-2F are conceptual diagrams illustrating a cross-sectional profile view of an example computing device having a flexible display and an autolocking cam system, in accordance with one or more aspects of this disclosure.

As shown in FIG. 2A, computing device 200, which is an example of computing device 100 shown in FIGS. 1A-1C, may include housings 210A, 210B, and 210C and flexible display 202 coupled to housings 210A and 210B. Slide module 216A is coupled to housing 210A and slide module 216B is coupled to housing 210B.

Support plates 204A may be coupled to joint 206A via connector 226A at end 203A of support plate 204A and may pivot about joint 206A. Support plate 204A may be coupled to joint 208A at end 205A of support plate 204A distal from end 203A via connector 218A. Slot 211A of slide module 216A accepts at least a portion of joint 208A to guide the movement of joint 208A along linear path of movement 217A, thereby guiding the movement of at least a portion of support plate 204A as support plate 204A pivots about joint 206A.

Similarly, support plates 204B may be coupled to joint 206B via connector 226B at end 203B of support plate 204B and may pivot about joint 206B. Support plate 204B may be coupled to joint 208B at end 205B of support plate 204B distal from end 203B via connector 218B. Slot 211B of slide module 216B accepts at least a portion of joint 208B to guide the movement of joint 208B along linear path of movement 217B, thereby guiding the movement of at least a portion of support plate 204B as support plate 204B pivots about joint 206B.

Computing device 200 may include an autolocking system that includes cam 252A that is coupled to joint 206A and spring-loaded pin 258A, where spring-loaded pin 258A may be coupled to or contained by joint module 215, which is similar to joint module 115 of FIGS. 1A-1C. Cam 252A may be a rotating component, such as a cylindrical-shaped shaft, that rotates about joint 206A so that exterior surface 254A of cam 252A rotates about joint 206A. In some examples, cam 252A may encircle joint 206A.

Cam 252A may be coupled to support plate 204A, such as by being a cylindrical portion of connector 226A coupled to end 203A of support plate 204A to joint 206A. Cam 252A may be coupled to joint 206A, such as by at least partially enclosing joint 206A, and may rotate about a longitudinal axis of joint 206A. As such, when support plate 204A pivots about joint 206A, cam 252A may correspondingly rotate according to the pivotal movement of support plate 204A and may rotates in correspondence with pivot movement of support plate 204A. Similarly, cam 252B may be coupled to support plate 204B, such as by being a cylindrical portion of connector 226B coupled to end 303B of support plate 204B to joint 206A. Cam 252B may be coupled to joint 206B, such as by at least partially enclosing joint 206B, and may rotate about a longitudinal axis of joint 206B. As such, when support plate 204B pivots about joint 206B, cam 252B may correspondingly rotate according to the pivotal movement of support plate 204B and may rotates in correspondence with pivot movement of support plate 204B.

Exterior surface 254A of cam 252A includes concave portions 256A-1 and 256A-2 for accepting spring-loaded pin 258A. Specifically, concave portion 256A-1 may accept spring-loaded pin 258A when computing device 200 is in a closed position, such as shown in FIG. 2A, to stabilize support plate 204A and to lock computing device 200 in the closed position. Locking computing device 200 in a closed position, as discussed in this disclosure, does not mean that spring-loaded pin 258A permanently fixes computing device 200 in a closed position when concave portion 256A-1 of cam 252A accepts spring-loaded pin 258A. Instead, spring-loaded pin 258A and concave portion 256A-1 of cam 252A may increase the amount of force that may be required in order for a user to rotate housing 210A to move computing device 200 from a closed position to a partially open position and/or a fully open position.

Figure 2B:
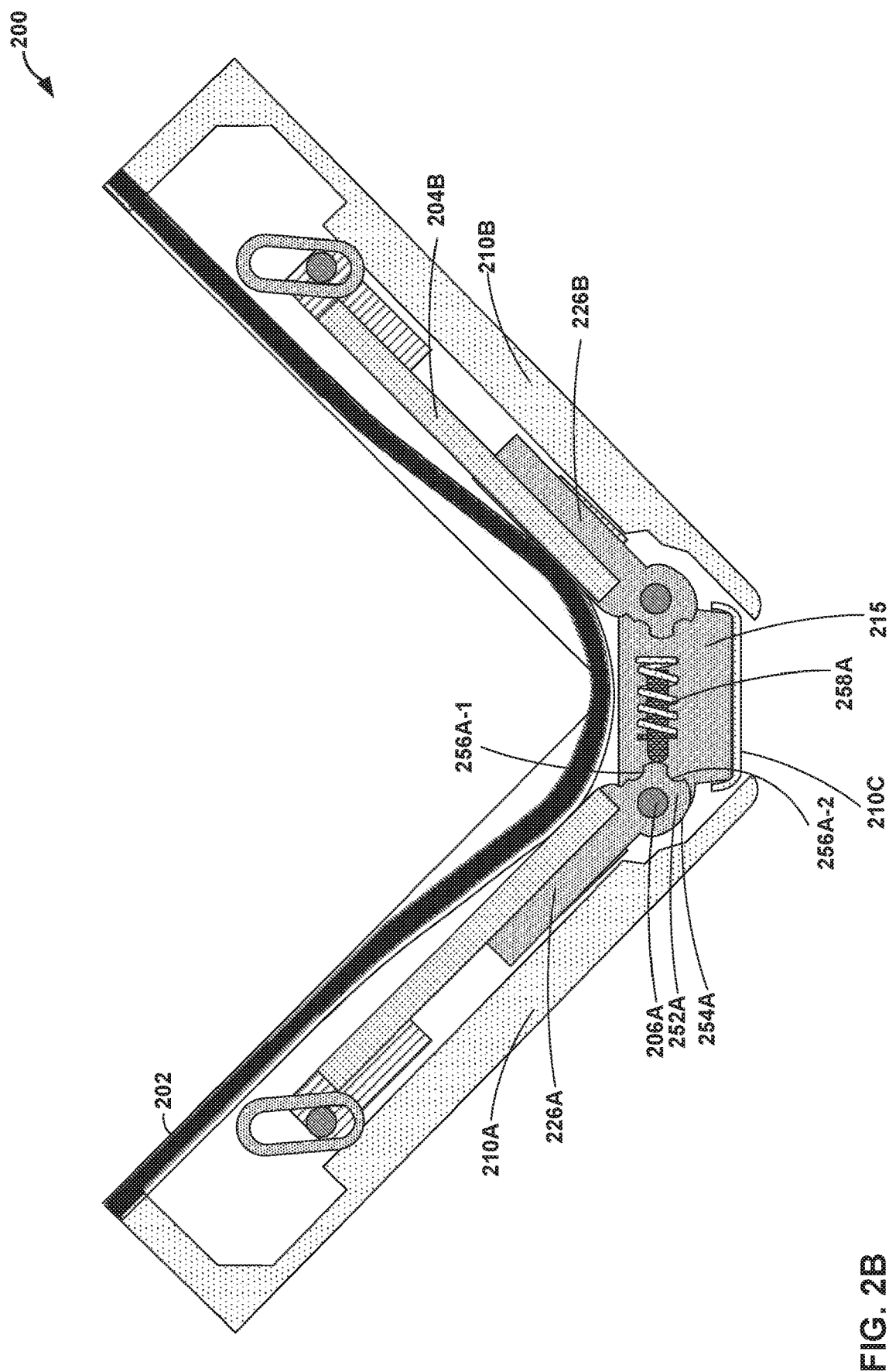

When housing 210A rotates outwards to transition computing device 200 from a closed position, such as shown in FIG. 2A, to a partially open position, such as shown in FIG. 2B, the cam 252A may rotate in a counter-clockwise direction according to the movement of support plate 204A so that concave portion 256A-1 of cam 252A is no longer lined up to accept spring-loaded pin 258A. Instead, exterior surface 254A of cam 252A between concave portions 256A-1 and 256A-2 of cam 252A pushes against spring-loaded pin 258A, thereby no longer locking computing device 200 in the closed position and reducing the amount of force necessary for a user to rotate housing 210A to move computing device 200 from the partially open position back to the closed position shown in FIG. 2A or to a fully open position shown in FIG. 2C.

Figure 2C:
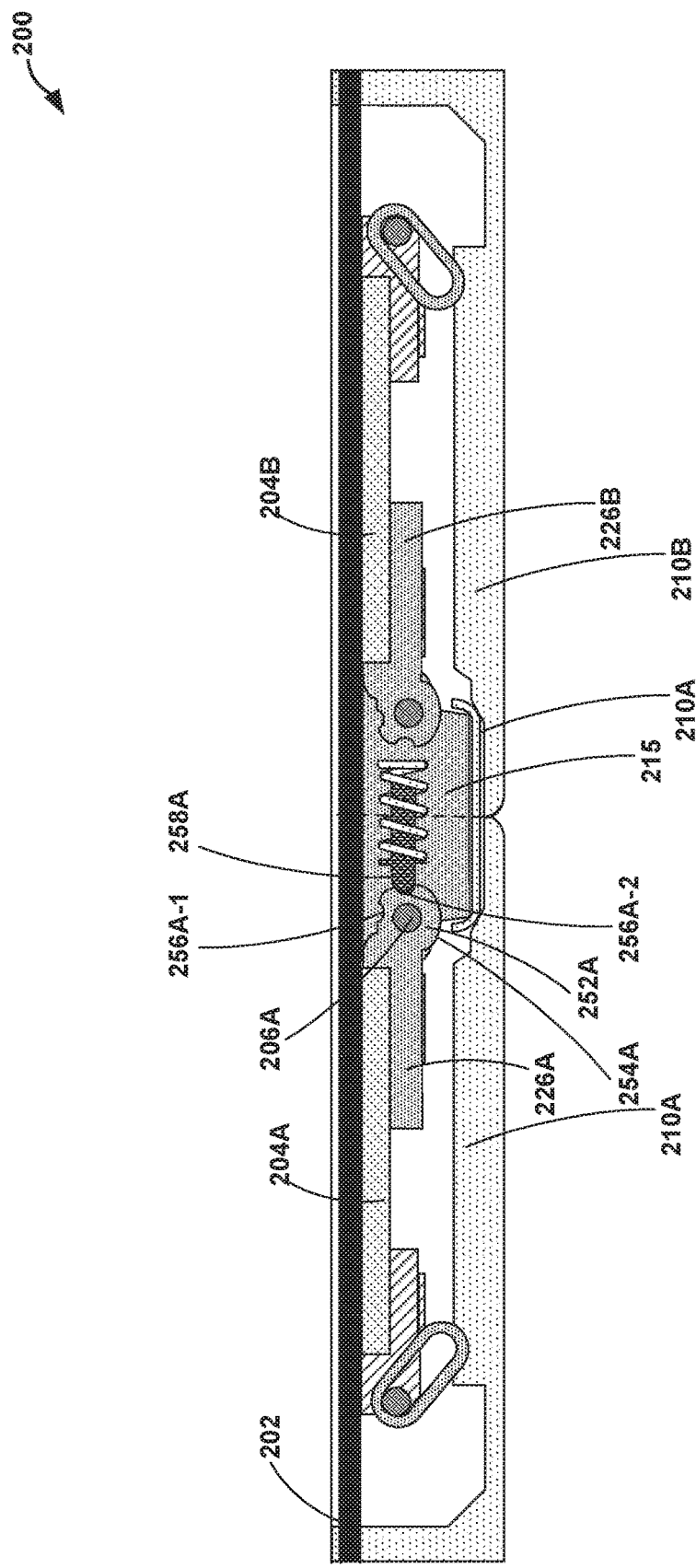

When housing 210A rotates outwards to transition computing device 200 from a partially open position, such as shown in FIG. 2B, to a fully open position, such as shown in FIG. 2C, concave portion 256A-2 of cam 252A may be lined up to accept spring-loaded pin 258A, thereby locking computing device 200 in the fully open position.

Similarly, when housing 210A rotates towards housing 210B to transition computing device 200 from a fully open position, such as shown in FIG. 2C, to a partially open position, such as shown in FIG. 2B, the cam 252A may rotate in a clockwise direction according to the movement of support plate 204A so that concave portion 256A-2 of cam 252A is no longer lined up to accept spring-loaded pin 258A. Instead, exterior surface 254A of cam 252A between concave portions 256A-1 and 256A-2 of cam 252A pushes against spring-loaded pin 258A, thereby no longer locking computing device 200 in the open position and reducing the amount of force necessary for a user to rotate housing 210A to move computing device 200 from the partially open position back to the closed position shown in FIG. 2A or to a fully open position shown in FIG. 2C.

When housing 210A rotates towards housing 210B to transition computing device 200 from a partially open position, such as shown in FIG. 2B, to a closed position, such as shown in FIG. 2A, concave portion 256A-1 of cam 252A may be lined up to accept spring-loaded pin 258A, thereby locking computing device 200 in the closed position.

Figure 2D:
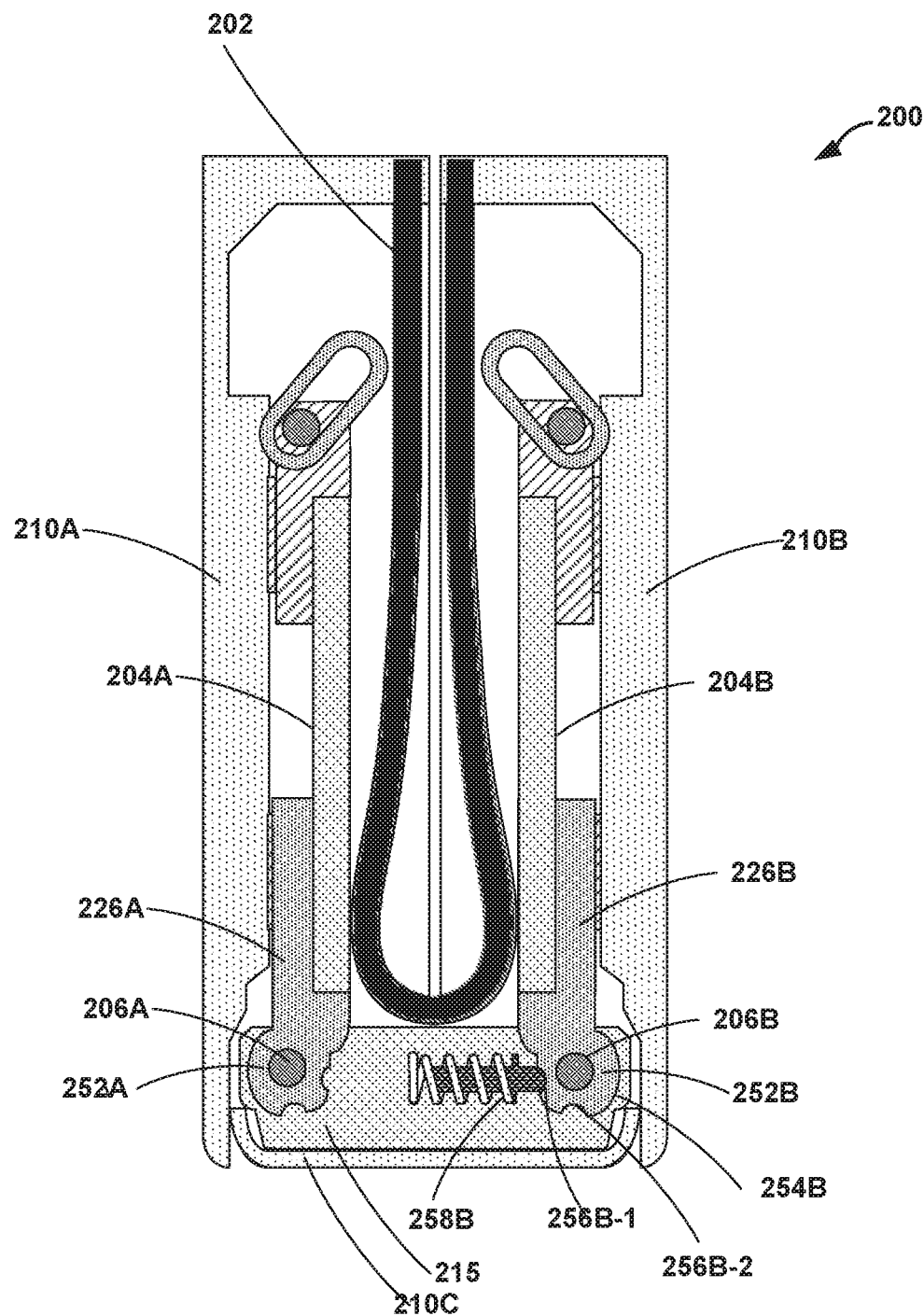
Figure 2E:
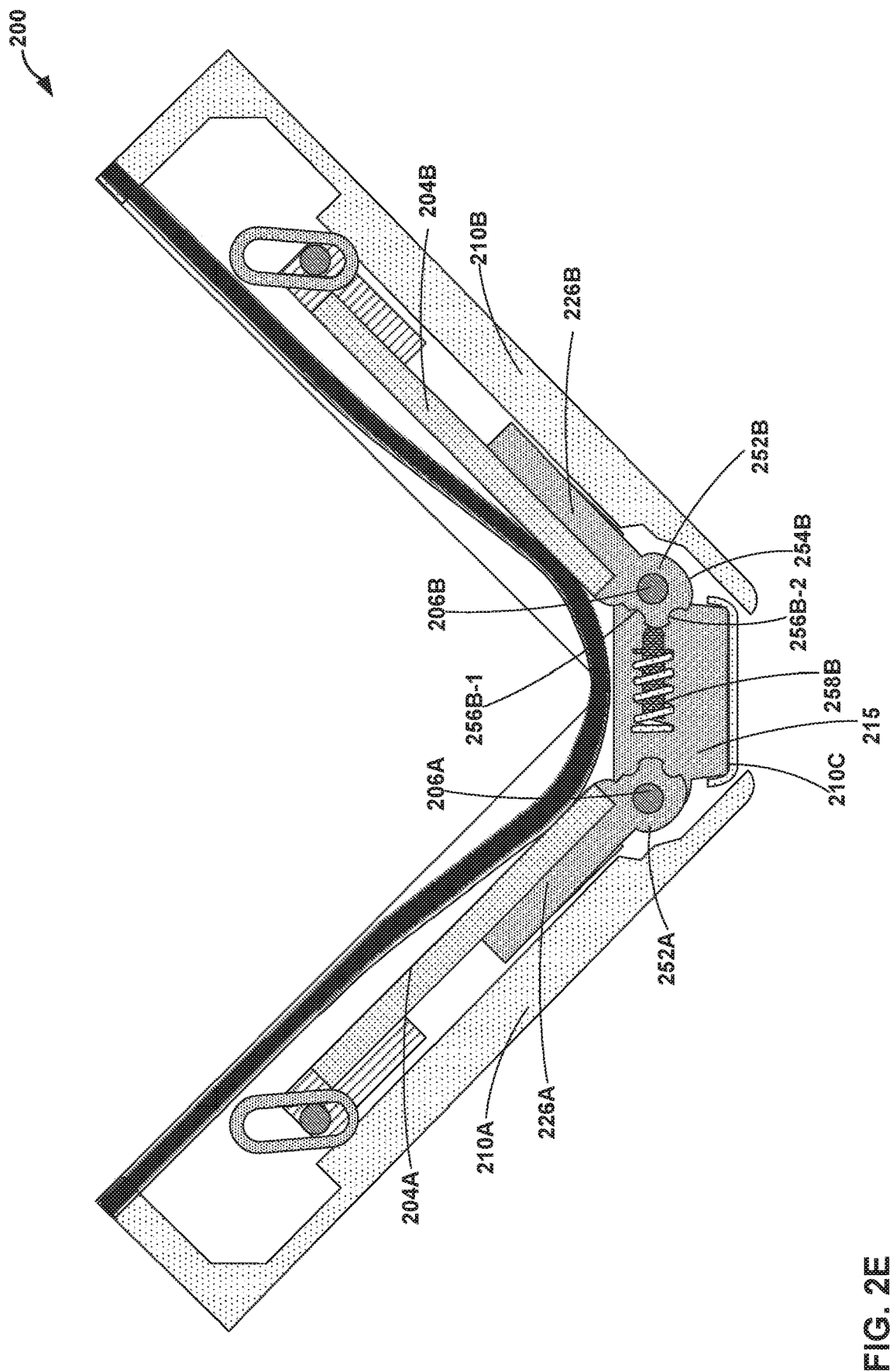
Figure 2F:
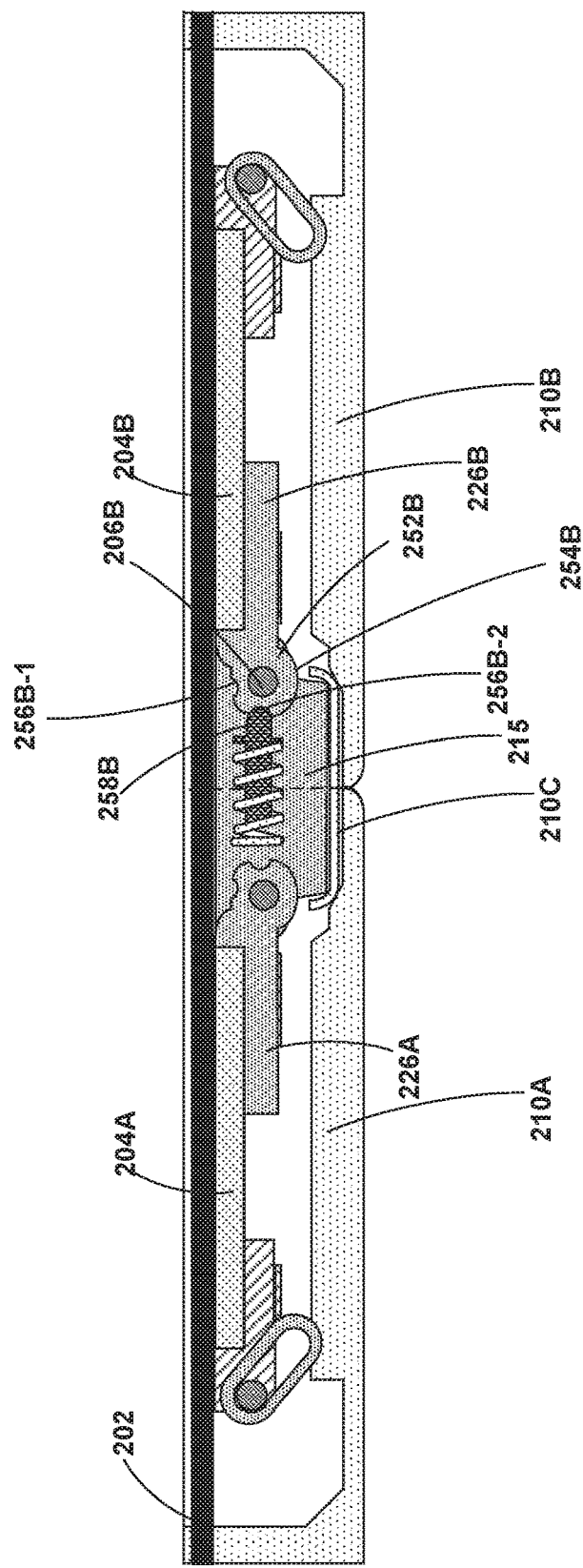

Similarly, as shown in FIGS. 2D-2F, an autolocking system may include cam 252B that is coupled to joint 206B and spring-loaded pin 258B, where spring-loaded pin 258B may be coupled to or contained by joint module 115. Cam 252B may be a rotating component, such as a cylindrical-shaped shaft, that rotates about joint 206B so that exterior surface 254B of cam 252B rotates about joint 206B. In some examples, cam 252B may encircle joint 206B.

As described above, cam 252B may be coupled to support plate 204B, such as by being a cylindrical portion of connector 226B coupled to end 103B of support plate 204B to joint 206A. Cam 252B may be coupled to joint 206B, such as by at least partially enclosing joint 206B, and may rotate about a longitudinal axis of joint 206B. As such, when support plate 204B pivots about joint 206B, cam 252B may correspondingly rotate according to the pivotal movement of support plate 204B.

Exterior surface 254B of cam 252B includes concave portions 256B-1 and 256B-2 for accepting spring-loaded pin 258B. Specifically, concave portion 256B-1 may accept spring-loaded pin 258B when computing device 200 is in a closed position, such as shown in FIG. 2D, to stabilize support plate 204B and to lock computing device 200 in the closed position. Locking computing device 200 in a closed position, as discussed in this disclosure, does not mean that spring-loaded pin 258B permanently fixes computing device 200 in a closed position when concave portion 256B-1 of cam 252B accepts spring-loaded pin 258B. Instead, spring-loaded pin 258B and concave portion 256B-1 of cam 252B may increase the amount of force that may be required in order for a user to rotate housing 210B to move computing device 200 from a closed position to a partially open position and/or a fully open position.

When housing 210B rotates outwards to transition computing device 200 from a closed position, such as shown in FIG. 2D, to a partially open position, such as shown in FIG. 2E, the cam 252B may rotate in a clockwise direction so that concave portion 256B-1 of cam 252B is no longer lined up to accept spring-loaded pin 258B. Instead, exterior surface 254B of cam 252B between concave portions 256B-1 and 256B-2 of cam 252B pushes against spring-loaded pin 258B, thereby no longer locking computing device 200 in the closed position and reducing the amount of force necessary for a user to rotate housing 210B to move computing device 200 from the partially open position back to the closed position shown in FIG. 2D or to a fully open position shown in FIG. 2F.

When housing 210B rotates outwards to transition computing device 200 from a partially open position, such as shown in FIG. 2E, to a fully open position, such as shown in FIG. 2F, concave portion 256B-2 of cam 252B may be lined up to accept spring-loaded pin 258B, thereby locking computing device 200 in the fully open position.

Similarly, when housing 200B rotates towards housing 210A to transition computing device 200 from a fully open position, such as shown in FIG. 2F, to a partially open position, such as shown in FIG. 2E, the cam 252B may rotate in a counter-clockwise direction according to the movement of support plate 204B so that concave portion 256B-2 of cam 252B is no longer lined up to accept spring-loaded pin 258B. Instead, exterior surface 254B of cam 252B between concave portions 256B-1 and 256B-2 of cam 252B pushes against spring-loaded pin 258B, thereby no longer locking computing device 200 in the open position and reducing the amount of force necessary for a user to rotate housing 210B to move computing device 200 from the partially open position back to the closed position shown in FIG. 2D or to a fully open position shown in FIG. 2F.

When housing 210B rotates towards housing 210A to transition computing device 200 from a partially open position, such as shown in FIG. 2E, to a closed position, such as shown in FIG. 2D, concave portion 256B-1 of cam 252B may be lined up to accept spring-loaded pin 258B, thereby locking computing device 200 in the closed position.

In some examples, a computing device, such as computing device 100 shown in FIGS. 1A-1C and computing device 200 shown in FIGS. 2A-2F, may use gears to synchronize the movement of housings of the computing device (e.g., housing 210A and housing 210B of computing device 200), so that housing 210A and housing 210B may concurrently rotate away from each other or towards each other at the same speed. That is, the gears may prevent housing 210A and housing 210B to concurrently rotatably move at different speeds, and may prevent, for example, housing 210A to rotatably move toward housing 210B while housing 210B remains stationary or while housing 210B is rotatably moving away from housing 210A. Synchronizing the movement of housing 210A and housing 210B may help prevent potential damage to flexible display 202.

Figure 3A:
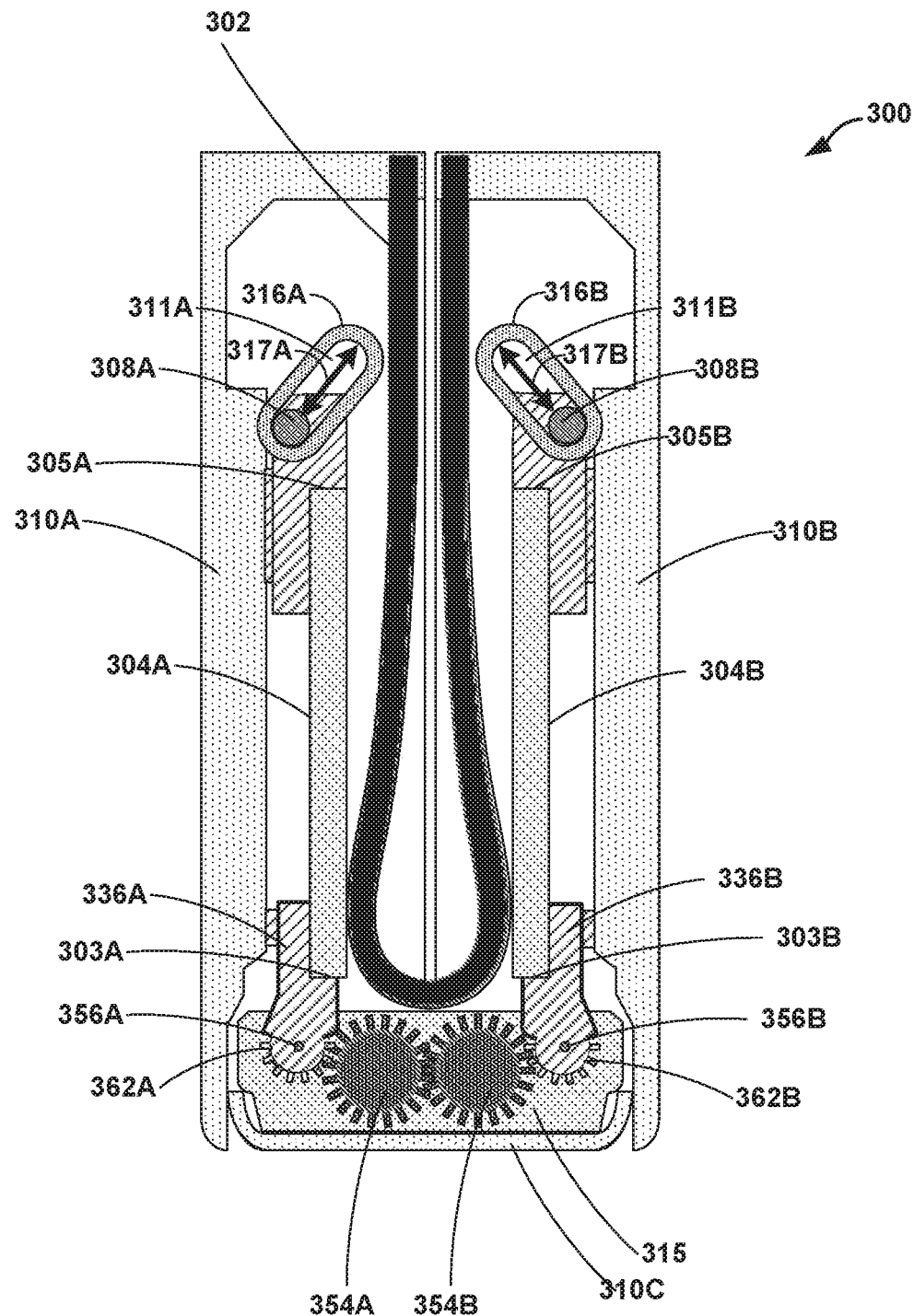
FIGS. 3A and 3B are conceptual diagrams illustrating a cross-sectional profile view of an example computing device having gears for synchronizing the movement of the housings of the computing device, in accordance with one or more aspects of this disclosure.
Figure 3B:
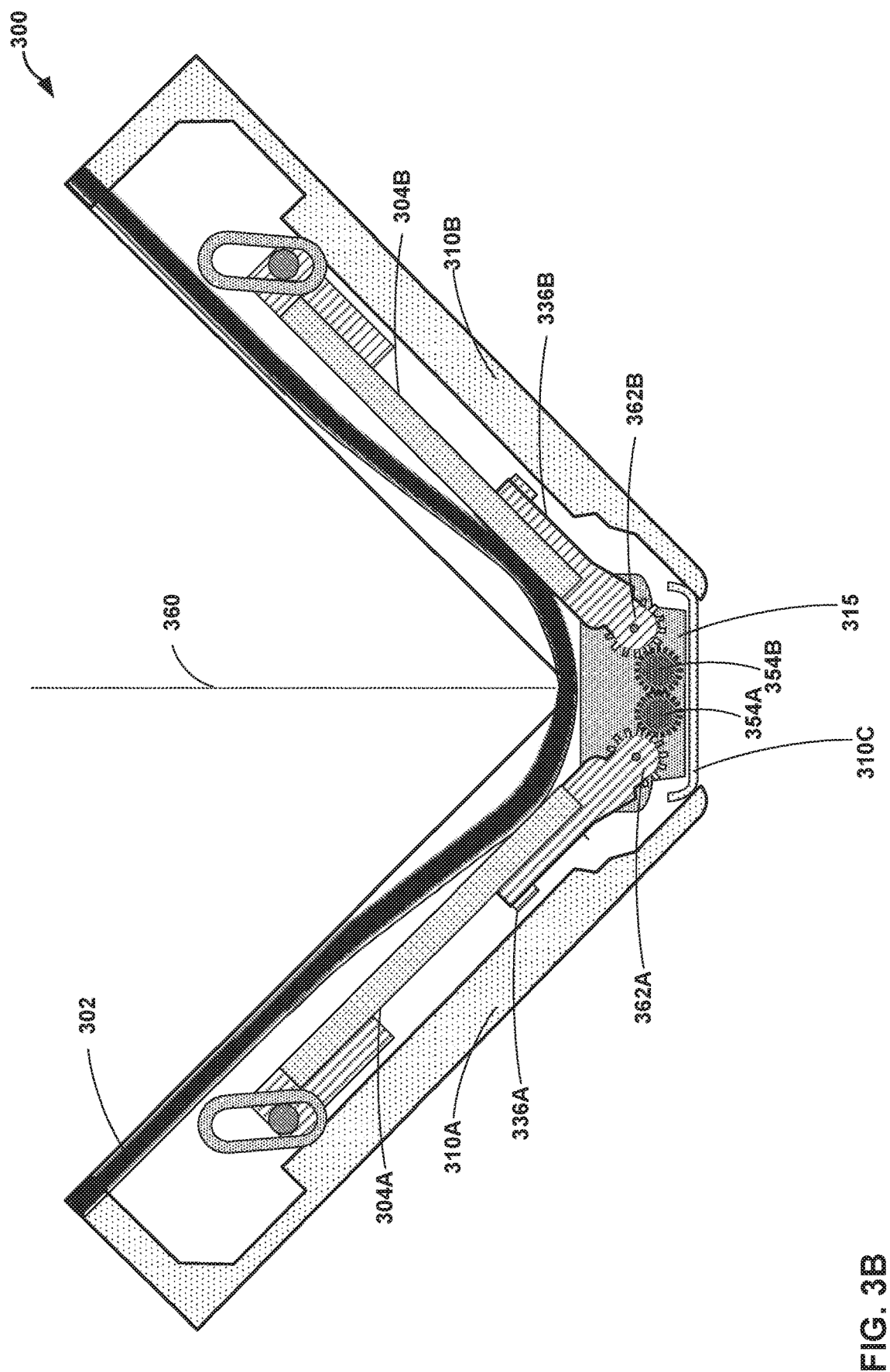

FIGS. 3A and 3B are conceptual diagrams illustrating a cross-sectional profile view of an example computing device having gears for synchronizing the movement of the housings of the computing device, in accordance with one or more aspects of this disclosure.

As shown in FIG. 3A, computing device 300, which is an example of computing device 100 shown in FIGS. 1A-1C and computing device 200 shown in FIGS. 2A-2F, may include housings 310A, 310B, and 310C and flexible display 302 coupled to housings 310A and 310B. Slide module 316A is coupled to housing 310A and slide module 316B is coupled to housing 310B.

Support plates 304A may be coupled to a joint at end 303A of support plate 304A and may pivot about the joint. Support plate 304A may be coupled to joint 308A at end 305A of support plate 304A distal from end 303A via connector 318A. Slot 311A of slide module 216A accepts at least a portion of joint 308A to guide the movement of joint 308A along linear path of movement 317A, thereby guiding the movement of at least a portion of support plate 304A as support plate 304A pivots.

Similarly, support plates 304B may be coupled to joint 206B via connector 226B at end 303B of support plate 304B and may pivot about joint 206B. Support plate 304B may be coupled to joint 308B at end 305B of support plate 304B distal from end 303B via connector 318B. Slot 311B of slide module 216B accepts at least a portion of joint 308B to guide the movement of joint 308B along linear path of movement 317B, thereby guiding the movement of at least a portion of support plate 304B as support plate 304B pivots.

Gear 362A may be a circular gear coupled to support plate 304A, such as by being a portion of connector 336A that couples to end 303A of support plate 304A. Gear 362A may rotate about axis 356A, and the rotation of gear 362A may therefore correspond to the pivot movement of support plate 304A. For example, gear 362A may rotate counter-clockwise as computing device 300 is opened and may rotate clockwise as computing device 300 is closed.

Similarly, gear 362B may be a circular gear coupled to support plate 304B, such as being a portion of connector 336B that couples to end 303B of support plate 304B. Gear 362B may rotate about axis 356B, and the rotation of gear 362B may therefore correspond to the pivot movement of support plate 304B. For example, gear 362B may rotate clockwise as computing device 300 is opened and may rotate clockwise as computing device 300 is closed.

Gear 362A may mesh with gear 354A and gear 362B may mesh with gear 354B, where each of gears 354A and 354B may also be circular gears contained in or coupled to joint module 315. That is, the teeth of gear 362A may mesh with the teeth of gear 354A, and the teeth of gear 362B may mesh with the teeth of gear 354B. Further, gear 354A may mesh with gear 354B, so that the teeth of gear 354A may mesh with the teeth of gear 354B. In some examples, the center of each of gears 362A, 362B, 354A, and 354B may form a straight line.

Thus, when computing device 300 in the closed position is opened, such as when housing 310A pivots to rotate away from housing 310B, gear 362A may rotate in a counter-clockwise direction, thereby causing gear 354A to rotate in a clockwise direction. Similarly, when computing device 300 in the closed position is opened, and housing 310B pivots to rotate away from housing 310A, gear 362B may rotate in a clockwise direction, thereby causing gear 354B to rotate in a clockwise direction.

Because gear 354A and 354B are meshed with each other, and because gears 354A and 354B are also meshed with gears 362A and 354B, respectively, the rotational movements of housing 310A and housing 310B are thereby synchronized. That is, because the speed and the amount of rotation of gears 362A and 362B are synchronized, the speed and amount of rotational movements of housing 310A and housing 310B are thereby also synchronized.

As shown in FIG. 3B, gears 362A and 362B and gears 354A and 354B may synchronize the movements of housing 310A and housing 310B so that computing device 300 transitions from being in a closed position, as shown in FIG. 3A to being in a partially open position, as shown in FIG. 3B. Due to housing 310A and housing 310B being synchronized via gears 362A and 362B and gears 354A and 354B, the angle between housing 310A and centerline 360 may always be the same as the angle between housing 310B and centerline 360 as housing 310A and housing 310B rotatably moves to transition computing device 300 between a closed position and an open position.

Figure 4:
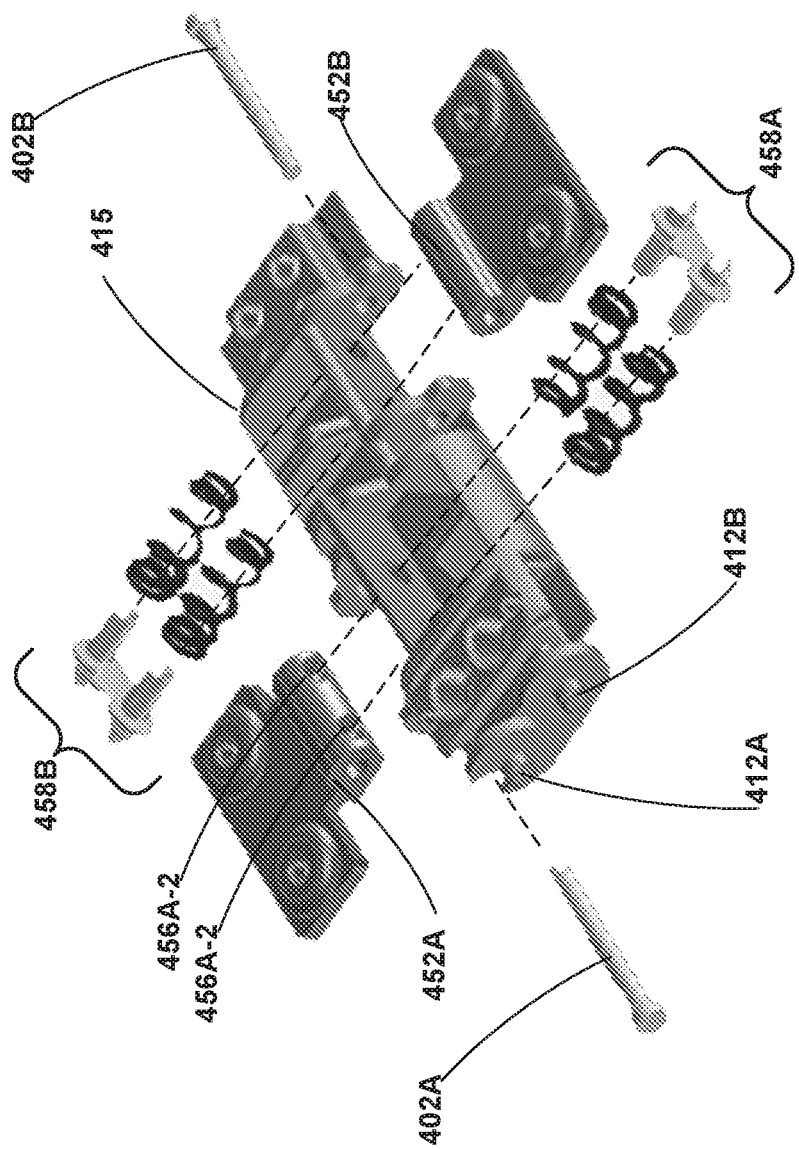
FIG. 4 is a conceptual diagram illustrating an exploded view of an example joint module of an example computing device in further detail, in accordance with some aspects of the present disclosure.

FIG. 4 is a conceptual diagram illustrating an exploded view of an example joint module 415 in further detail, in accordance with some aspects of the present disclosure. As shown in FIG. 4, joint module 415 may be an example of joint module 115 of FIGS. 1A-1C, joint module 215 of FIGS. 2A-2F, and joint module 315 of FIGS. 3A and 3B. Joint module 415 may include joints 412A and 412B, which may be examples of 112A and 112B, respectively, of FIGS. 1A-1C, that may couple to housing 110A and housing 110B of computing device 100 of FIGS. 1A-1C.

Joint module 415 may accept cam 452A and spring-loaded pin 458A, where pin 402A may operably couple and/or connect cam 452A to joint module 415. Pin 402A is an example of joint 106A of FIGS. 1A-1C, and cam 452A may rotate about a longitudinal axis of pin 402A. As shown in FIG. 4, cam 452A may include a parallel set of concave portions 456A-2 for accepting spring-loaded pin 458A. In some examples, cam 452A is an example of cam 252A of FIGS. 2A-2F, and spring-loaded pin 458A may be example of spring-loaded pin 258A of FIGS. 2A-2F.

Similarly, joint module 415 may accept cam 4252B and spring-loaded pin 458B, where pin 402B may operably couple and/or connect cam 452B to joint module 415. Pin 402B is an example of joint 106B of FIGS. 1A-1C, and cam 452B may rotate about a longitudinal axis of pin 402B. In some examples, cam 452B is an example of cam 252B of FIGS. 2A-2F, and spring-loaded pin 458B may be example of spring-loaded pin 258B of FIGS. 2A-2F.

Figure 5:
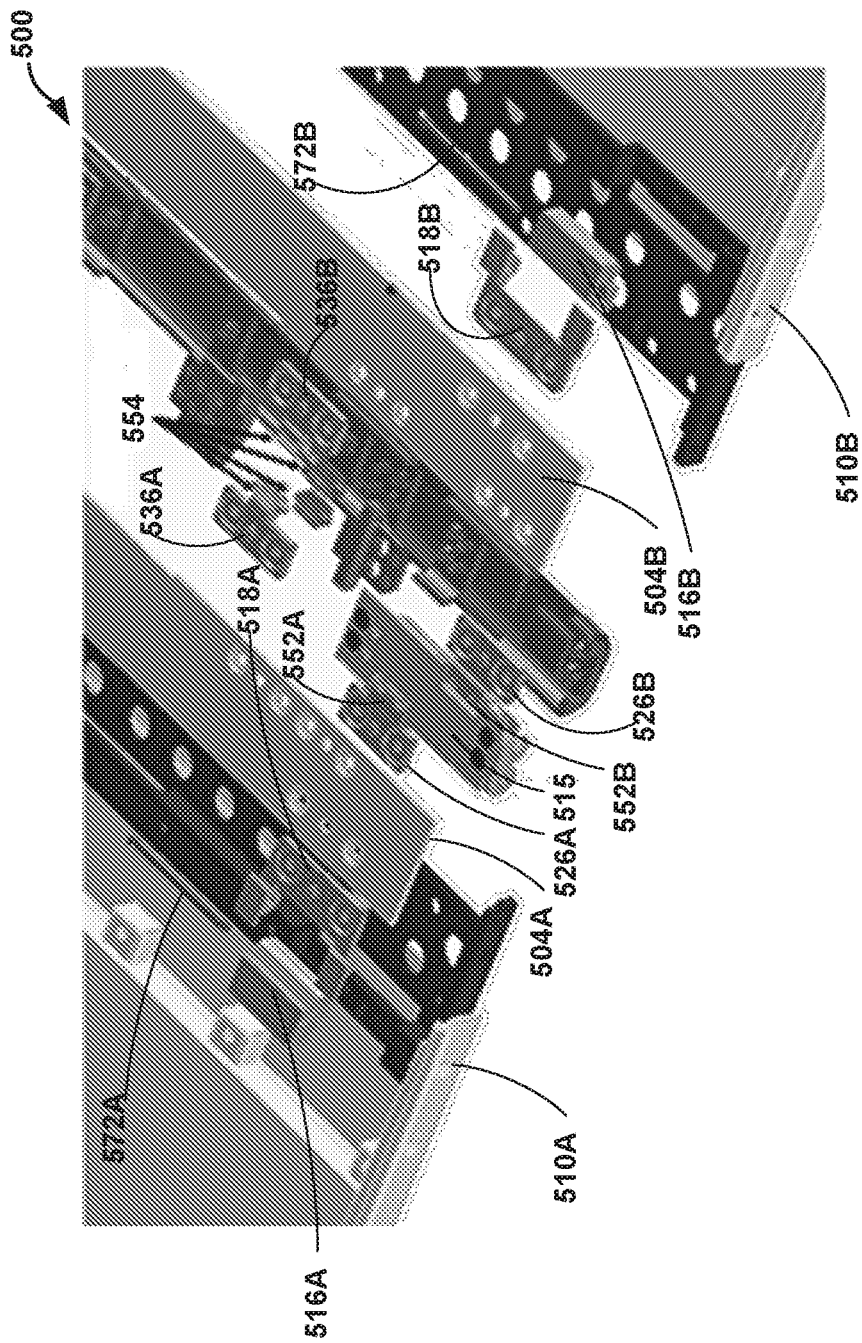
FIG. 5 is a conceptual diagram illustrating an exploded view of a portion of an example computing device, in accordance with some aspects of the present disclosure.

FIG. 5 is a conceptual diagram illustrating an exploded view of a portion of an example computing device 500, in accordance with some aspects of the present disclosure. As shown in FIG. 5, computing device 500 may be an example of computing device 100 shown in FIGS. 1A-1C, computing device 200 shown in FIGS. 2A-2F, and computing device 300 shown in FIGS. 3A and 3B.

Housing 510A of computing device 500, which may be an example of housing 110A of FIGS. 1A-1C, housing 210A of FIGS. 2A-2F, and housing 310A of FIGS. 3A-3F, may be coupled to slide module 516A, which may be an example of slide module 116A of FIGS. 1A-1C, slide module 216A of FIGS. 2A-2F, and slide module 316A of FIGS. 3A-3F. Support plate 504A of computing device 500, which may be an example of support plate 104A of FIGS. 1A-1C, support plate 204A of FIGS. 2A-2F, and support plate 304A of FIGS. 3A-3F, may be coupled via connector 518A, which may be an example of connector 118A of FIGS. 1A-1C, connector 218A of FIGS. 2A-2F, and connector 318A of FIGS. 3A-3F, to pin 572A, which is an example of joint 108A of FIGS. 1A-1C. Pin 572A may be inserted into connector 518A and a slot (not shown in FIG. 5) of slide module 516A, where the slot of slide module 516A guides the movement of pin 572A along a linear path within slide module 516A.

Similarly, housing 510B of computing device 500, which may be an example of housing 110B of FIGS. 1A-1C, housing 210B of FIGS. 2A-2F, and housing 310B of FIGS. 3A-3F, may be coupled to slide module 516B, which may be an example of slide module 116B of FIGS. 1A-1C, slide module 216B of FIGS. 2A-2F, and slide module 316B of FIGS. 3A-3F. Support plate 504B of computing device 500, which may be an example of support plate 104B of FIGS. 1A-1C, support plate 204B of FIGS. 2A-2F, and support plate 304B of FIGS. 3A-3F, may be coupled via connector 518B, which may be an example of connector 118B of FIGS. 1A-1C, connector 218B of FIGS. 2A-2F, and connector 318B of FIGS. 3A-3F, to pin 572B, which is an example of joint 108B of FIGS. 1A-1C. Pin 572B may be inserted into connector 518B and a slot (not shown in FIG. 5) of slide module 516A, where the slot of slide module 516A guides the movement of pin 572B along a linear path within slide module 516B.

Support plate 504A may be coupled to joint module 515 via connector 526A, which may be an example of connector 226A of FIGS. 2A-2F. Connector 526A may include cam 552A, which may be an example of cam 552A of FIGS. 2A-2F. Similarly, support plate 504B may be coupled to joint module 515 via connector 526B, which may be an example of connector 226B of FIGS. 2A-2F. Connector 526B may include cam 552B, which may be an example of cam 552B of FIGS. 2A-2F In some examples, support plate 504A is coupled to connector 536A, which may be an example of connector 336A of FIGS. 3A-3B. Similarly, support plate 504B may be coupled to connector 536B, which may be an example of connector 526B of FIGS. 3A-3B. Connectors 536A and 536B are linked via gears 554, which may include, for example, gears 362A and 362B of FIGS. 3A-3B meshed with gears 354A and 354B of FIGS. 3A-3B.

Figure 6:
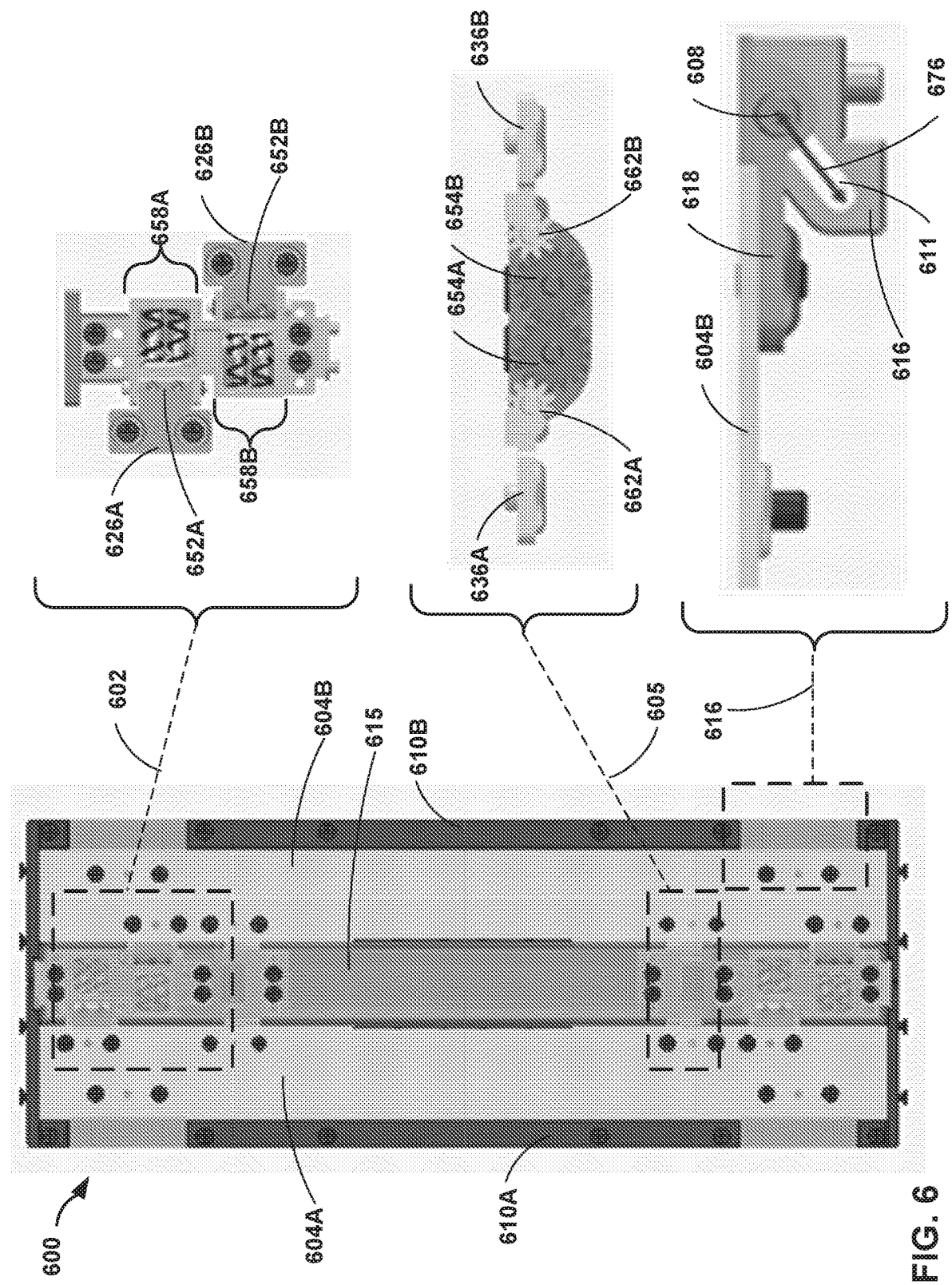
FIG. 6 is a conceptual diagram illustrating a plan view of a portion of an example computing device, in accordance with some aspects of the present disclosure.

FIG. 6 is a conceptual diagram illustrating a plan view of a portion of an example computing device 600, in accordance with some aspects of the present disclosure. As shown in FIG. 6, computing device 600, which is an example of computing device 100 of FIGS. 1A-1C, computing device 200 of FIGS. 1A-1F, computing device 300 of FIGS. 3A and 3B, and computing device 500 of FIG. 5, includes joint module 615 coupled to support plates 604A and 604B and housings 610A and 610B.

Support plates 604A and 604B and housings 610A and 610B may be examples of support plates 104A and 104B and housings 110A and 110B, respectively, of FIGS. 1A-1C, support plates 204A and 204B and housings 210A and 210B, respectively, of FIGS. 2A-2F, support plates 304A and 304B and housings 310A and 310B, respectively, of FIGS. 3A and 3B, and support plates 504A and 504B and housings 510A and 510B, respectively, of FIG. 5. Similarly, joint module 615 may be an example of joint module 115 of FIGS. 1A-1C, joint module 215 of FIGS. 2A-2F, joint module 315 of FIGS. 3A and 3B, joint module 415 of FIG. 4, and joint module 515 of FIG. 5.

Computing device 600 may include autolocking cam system 602 that includes connector 626A that is coupled to cam 652A that may rotate to accept spring-loaded pin 658A in joint module 615 at one or more concave portions (not shown) of cam 652A. Similarly, autolocking cam system 602 also includes connector 626B that is coupled to cam 652B that may rotate to accept spring-loaded pin 658B in joint module 615 at one or more concave portions (not shown) of cam 652B. In some examples, cams 652A and 652B are examples of cams 252A and 252B of FIGS. 2A-2F, cams 452A and 452B of FIG. 4, and cams 552A and 552B of FIG. 5. Similarly, connectors 626A and 626B are examples of connectors 226A and 226B of FIGS. 2A-2F and connectors 526A and 526B of FIG. 5. Spring-loaded pins 658A and 658B are examples of spring-loaded pins 258A and 258B of FIGS. 2A-2F and spring-loaded pins 458A and 458B of FIG. 4.

Computing device 600 may also include gear module 605. Gear module 605 may include gear 654A meshed with gear 654B in joint module 615. Gear module 605 may also include gear 662A meshed with gear 654B, where gear 662A is coupled to support plate 604A via connector 656A. Similarly, gear module 605 may also include gear 662B meshed with gear 654B, where gear 662B is coupled to support plate 604B via connector 656B. In some examples, gears 662A-B and 654A-B are examples of gears 362A-B and 354A-B of FIGS. 3A-3B. Similarly, connectors 656A-656B are examples of connectors 336A-336B of FIGS. 3A-3B and connectors 536A-536B of FIG. 5.

Computing device 600 may include one or more slide modules. For example, computing device 100 may include slide module 616 coupled to housing 610B, where slide module 616 is an example of slide modules 116A-116B of FIGS. 1A-1C, slide modules 216A-216B of FIGS. 2A-2F, slide modules 316A-316B of FIGS. 3A-3B, and slide modules 516A-516B of FIG. 5. Slide module 616 may include slot 611 that accepts joint 608 that is coupled to support plate 604B via connector 618. Slot 611 may guide the movement of joint 608 along linear path 676. That is, slot 611 may guide the movement of joint 608 such that joint 608 may be limited to only a linear movement along linear path 676.

Figure 7:
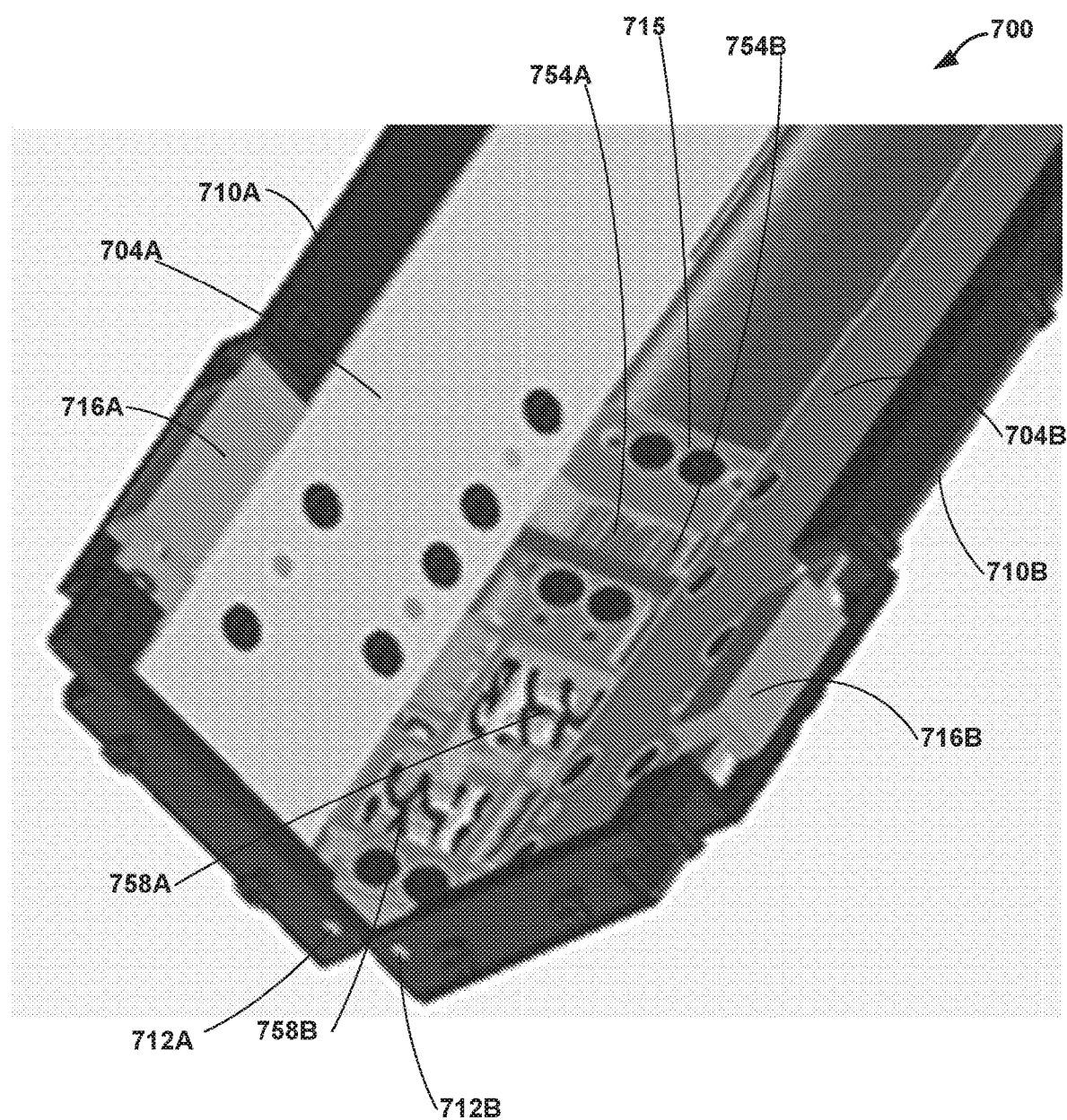
FIG. 7 is a conceptual diagram illustrating a perspective view of a portion of an example computing device, in accordance with some aspects of the present disclosure.

FIG. 7 is a conceptual diagram illustrating a perspective view of a portion of an example computing device 700, in accordance with aspects of the present disclosure. As shown in FIG. 7, Computing device 700 is an example of computing device 100 of FIGS. 1A-1C, computing device 200 of FIGS. 1A-1F, computing device 300 of FIGS. 3A and 3B, computing device 500 of FIG. 5, and computing device 600 of FIG. 6.

Support plates 704A and 704B and housings 710A and 710B of computing device 700 may be examples of support plates 104A 104B and housings 110A and 110B, respectively, of FIGS. 1A-1C, support plates 204A and 204B and housings 210A and 210B, respectively, of FIGS. 2A-2F, support plates 304A and 304B and housings 310A and 310B, respectively, of FIGS. 3A and 3B, support plates 504A and 504B and housings 510A and 510B, respectively, of FIG. 5, and support plates 604A and 604B and housings 610A and 610B, respectively, of FIG. 6. Similarly, joint module 715 of computing device 700 may be an example of joint module 115 of FIGS. 1A-1C, joint module 215 of FIGS. 2A-2F, joint module 315 of FIGS. 3A and 3B, joint module 415 of FIG. 4, joint module 515 of FIG. 5, and joint module 615 of FIG. 6.

Housing 710A and housing 710B may form a clamshell to rotate away from each other and/or towards each other to open and close computing device 700. Specifically housing 710A may rotate about joint 712A coupled to joint module 715 and housing 710B may rotate about joint 712B coupled to joint module 715, where joints 712A and 712B may be examples of joints 112A and 112B of FIGS. 1A-1C.

Joint module 715 may include or otherwise contain spring-loaded pin 758A and spring-loaded pin 758B, which may be examples of spring-loaded pins 258A-258B of FIGS. 2A-2F, as part of an autolocking cam system, such as autolocking cam system 602 of FIG. 6. Joint module 715 may also include or otherwise contain gears 754A and 754B, which may be examples of gears 354A and 354B of FIGS. 3A-3B, and which may be part of gear module 605 of FIG. 6 for synchronizing the rotation of housing 710A and housing 710B.

Housing 710A may be coupled to slide module 716A, which may guide the movement of support plate 704A as housing 710A rotates. Similarly, housing 710B may be coupled to slide module 716B, which may guide the movement of support plate 704B as housing 710B rotates. In some examples, slide modules 716A-716B are examples of slide modules 116A-116B of FIGS. 1A-1C, slide modules 216A-216B of FIGS. 2A-2F, slide modules 316A-316B of FIGS. 3A-3B, slide modules 516A-516B of FIG. 5, and slide module 616 of FIG. 6.

Various aspects of the disclosure have been described. These and other embodiments are within the scope of the following claims.

What is claimed is:

1. A computing device comprising:
   a housing;
   a flexible display operable to be folded to a first position and unfolded to a second position, wherein the flexible display is coupled to the housing;
   a support plate for supporting at least a portion of the flexible display when the flexible display is unfolded to at least the second position, the support plate being disposed within the housing between at least a portion of the flexible display and a portion of the housing, the support plate having a first joint coupled to a first end of the support plate and a second joint coupled to a second end of the support plate distal from the first end of the support plate, and the support plate being pivotable about the first joint as the flexible display is folded and unfolded between the first position and the second position; and
   a slide module in the housing having a fixed position in relation to the housing, the slide module having a slot that accepts the second joint and guides a linear slide movement of the second joint along a linear path of movement within the slot as the support plate pivots about the first joint;
   wherein the support plate moves according to the first joint and the second joint to support at least the portion of the flexible display when the flexible display is unfolded to the second position and moves according to the first joint and the second joint to create a gap between at least a portion of the support plate and at least the portion of the flexible display when the flexible display is folded to the first position.

2. The computing device of claim 1, further comprising:
   a cam at the first joint of the support plate that rotates in correspondence with pivot movement of the support plate about the first joint, the cam having a first concave portion on an exterior surface of the cam for accepting a spring-loaded pin when the flexible display is folded to the first position and a second concave portion on the exterior surface of the cam for accepting the spring-loaded pin when the flexible display is unfolded to the second position.

3. The computing device of claim 2, wherein the first joint comprises a first pin operably coupled to the cam, wherein the cam rotates about a longitudinal axis of the first pin.

4. The computing device of claim 1, wherein the second joint of the support plate comprises:
   a second pin operably coupled to the support plate, wherein a portion of the second pin is disposed within the slot of the slide module, and wherein the portion of the second pin disposed within the slot of the slide module moves along a linear path within the slot as the support plate pivots about the first joint.

5. The computing device of claim 1, wherein the housing is a first housing, wherein the support plate is a first support plate, and wherein the slide module is a first slide module, further comprising:
   a second housing, wherein the flexible display is coupled to the second housing;
   a second support plate for supporting a second portion of the flexible display when the flexible display is unfolded to at least the second position, the second support plate being disposed within the second housing between at least the second portion of the flexible display and a portion of the second housing, the second support plate having a third joint coupled to a first end of the second support plate and a fourth joint coupled to a second end of the second support plate distal from the first end of the second support plate, the second support plate being pivotable about the third joint as the flexible display is folded and unfolded between the first position and the second position; and a second slide module in the second housing having a fixed position in relation to the second housing, the second slide module having a second slot that accepts the fourth joint and guides a linear slide movement of the fourth joint along a linear path of movement within the second slot as the second support plate pivots about the third joint;

wherein the second support plate moves according to the third joint and the fourth joint to support at least the second portion of the flexible display when the flexible display is unfolded to the second position and moves according to the third joint and the fourth joint to create a gap between at least a portion of the second support plate and at least the second portion of the flexible display when the flexible display is folded to the first position.

6. The computing device of claim 5 further comprising:
a first gear at the first joint of the first support plate that meshes with a second gear, the first gear rotating in correspondence with pivot movement of the first support plate about the first joint; and
a third gear at the third joint of the second support plate that meshes with a fourth gear, the third gear rotating in correspondence with pivot movement of the second support plate about the third joint;
wherein the second gear meshes with the fourth gear.

7. The computing device of claim 1, further comprising:
a second cam at the third joint of the second support plate that rotates in correspondence with pivot movement of the second support plate about the third joint, the second cam having a first concave portion on an exterior surface of the second cam for accepting a second spring-loaded pin when the flexible display is folded to the first position and a second concave portion on the exterior surface of the second cam for accepting the second spring-loaded pin when the flexible display is unfolded to the second position.

8. The computing device of claim 7, wherein the third joint comprises a third pin operably coupled to the second cam, wherein the second cam rotates about a longitudinal axis of the third pin.

9. The computing device of claim 5, wherein the fourth joint of the second support plate comprises:
a fourth pin operably coupled to the second support plate, wherein a portion of the fourth pin is disposed within the second slot of the second slide module, and wherein the portion of the fourth pin disposed within the second slot of the second slide module moves along a linear path within the second slot as the second support plate pivots about the third joint.

10. A computing device comprising:
a flexible display operable to be folded and unfolded, wherein the flexible display is folded when the computing device is in a closed position and fully unfolded when the computing device is in an open position;
a first housing coupled to the flexible display, wherein the first housing pivots about a first joint coupled to the first housing;
a second housing coupled to the flexible display, wherein the second housing pivots about a second joint coupled to the second housing;
a slide module coupled to the first housing, the slide module having a slot; and
a support plate disposed between a portion of the first housing and a portion of the flexible display, wherein the support plate is coupled to a third joint at a first end of the support plate and to a fourth joint coupled to a second end of the support plate distal to the first end of the support plate, wherein the support plate rotates about the third joint, and wherein at least a portion of the fourth joint is disposed in the slot of the slide module;
wherein the slot of the slide module define a linear path of movement for the fourth joint such that when the support plate rotates about the third joint, the fourth joint moves according to the linear path of movement, such that when the first housing and the second housing rotatably moves away from each other, the movement of the fourth joint according to the linear path of movement causes a portion of the support plate to moves towards the flexible display and to meet the flexible display when the computing device is in the open position, and when the first housing and the second housing rotatably moves towards each other, the movement of the fourth joint according to the linear path of movement causes the portion of the support plate to move away from the flexible display and to leave a gap between the portion of the support plate and the flexible display when the computing device is in the closed position.

11. The computing device of claim 10, further comprising:
a cam coupled to the third joint of the support plate that rotates in correspondence with pivot movement of the support plate about the first joint, the cam having a first concave portion on an exterior surface of the cam for accepting a spring-loaded pin when the computing device is in the closed position and a second concave portion on the exterior surface of the cam for accepting the spring-loaded pin when the computing device is in the open position.

12. The computing device of claim 11, wherein the third joint comprises a first pin operably coupled to the cam, wherein the cam rotates about a longitudinal axis of the first pin.

13. The computing device of claim 10, wherein the slide module is a first module, wherein the slot is a first slot, wherein the support plate is a first support plate, and wherein the portion of the flexible display is a first portion of the flexible display, further comprising:
a second slide module coupled to the second housing, the second slide module having a second slot; and
a second support plate disposed between a portion of the second housing and a second portion of the flexible display, wherein the second support plate is coupled to a fifth joint at a first end of the second support plate and to a sixth joint coupled to a second end of the second support plate distal to the first end of the second support plate, wherein the second support plate rotates about the fifth joint, and wherein at least a portion of the sixth joint is disposed in the second slot of the second slide module;
wherein the second slot of the second slide module define a linear path of movement for the sixth joint such that when the second support plate rotates about the fifth joint, the sixth joint moves according to the linear path of movement, such that when the first housing and the second housing rotatably moves away from each other, the movement of the sixth joint according to the linear path of movement causes a portion of the second support plate to moves towards the flexible display and to meet the flexible display when the computing device is in the open position, and when the first housing and the second housing rotatably moves towards each other, the movement of the sixth joint according to the linear path of movement causes the portion of the second support plate to move away from the flexible display and to leave a gap between the portion of the second support plate and the flexible display when the computing device is in the closed position.

14. The computing device of claim 13, further comprising:

a second cam coupled to the fifth joint of the second support plate that rotates in correspondence with pivot movement of the second support plate about the first joint of the second support plate, the second cam having a first concave portion on an exterior surface of the second cam for accepting a second spring-loaded pin when the computing device is in the closed position and a second concave portion on the exterior surface of the second cam for accepting the second spring-loaded pin when the computing device is in the open position.

15. The computing device of claim 14, wherein the fifth joint comprises a second pin operably coupled to the second cam, wherein the second cam rotates about a longitudinal axis of the second pin.

16. The computing device of claim 10, further comprising:

a first gear at the first joint of the first support plate that meshes with a second gear, the first gear rotating in correspondence with pivot movement of the first support plate about the first joint of the first support plate; and a third gear at the first joint of the second support plate that meshes with a fourth gear, the third gear rotating in correspondence with pivot movement of the second support plate about the first joint of the second support plate;

wherein the second gear meshes with the fourth gear.

* * * * *